(12) United States Patent
Edge

(10) Patent No.: US 7,155,244 B2
(45) Date of Patent: Dec. 26, 2006

(54) PRECISE COMMON TIMING IN A WIRELESS NETWORK

(75) Inventor: Stephen William Edge, Escondido, CA (US)

(73) Assignee: Siemens Communications, Inc., Baco Raton, FL (US)

(*) Notice: Subject to any disclaimer, the term of this patent is extended or adjusted under 35 U.S.C. 154(b) by 472 days.

(21) Appl. No.: 10/641,928

(22) Filed: Aug. 14, 2003

(65) Prior Publication Data
US 2005/0037786 A1 Feb. 17, 2005

(51) Int. Cl.
*H04B 15/00* (2006.01)
*H04B 7/005* (2006.01)
*H04B 7/01* (2006.01)
*H04B 7/015* (2006.01)

(52) U.S. Cl. .................. 455/502; 455/500; 455/517; 370/503; 375/356

(58) Field of Classification Search ............... 455/500, 455/502, 517; 370/503, 508; 342/357.06, 342/357.1, 357.12
See application file for complete search history.

(56) References Cited

U.S. PATENT DOCUMENTS

| | | | |
|---|---|---|---|
| 6,529,165 B1 | 3/2003 | Duffett-Smith et al. ...... | 342/463 |
| 6,756,941 B1* | 6/2004 | Martikkala ................... | 342/387 |
| 6,937,872 B1* | 8/2005 | Krasner ....................... | 455/502 |
| 2004/0214585 A1* | 10/2004 | Olaker ..................... | 455/456.1 |
| 2005/0054312 A1* | 3/2005 | Spirito et al. ............. | 455/226.1 |

* cited by examiner

Primary Examiner—Quochien B. Vuong
Assistant Examiner—Tuan H. Nguyen

(57) ABSTRACT

A method of providing precise common timing in a wireless communications network including at least one timing marker unit with a precise common time source, e.g., GPS. Wireless mobile units and/or timing marker units periodically measure transmission timing differences between pairs of neighboring base stations and each provide the measurements to a base station or central network entity. Timing marker units measure timing associations and return the results. An absolute transmission timing difference (ATD) is determined for each base station timing difference measurement. ATDs are collected and combined for each pair of base stations. A timing relationship is developed for all base stations from the combined ATDs, relating transmission timing of non-reference base stations to reference base stations. Timing associations are extracted for non-reference base stations from these timing difference relationships and the timing associations for the reference base stations.

62 Claims, 13 Drawing Sheets

PRECISE COMMON TIMING IN A WIRELESS NETWORK

RELATED APPLICATION

The present application is related to U.S. patent application Ser. No. 10/410,843 entitled "Base Station Synchronization In A Wireless Network" to Stephen William Edge, filed Apr. 10, 2003, and assigned to the assignee of the present invention and to U.S. patent application Ser. No. 09/971,990, entitled "Method And Apparatus For Wireless Network Timekeeping And Synchronization" to Stephen William Edge et al., filed Oct. 4, 2001 and published Apr. 10, 2003 as published application number 20030069033.

BACKGROUND OF THE INVENTION

1. Field of the Invention

The present invention is related to wireless communications networks and, more particularly, to distributing precision timing throughout a wireless network.

2. Background Description

A number of applications currently exist within wireless communication systems, such as those supporting Global System for Mobile Communication (GSM), Time Division Multiple Access (TDMA), Code Division Multiple Access (CDMA) and Universal Mobile Telecommunications System (UMTS) technologies, for which precise common timing information is needed by mobile units and by other entities in the wireless network. Examples of such applications include Global System for Mobile Communication (GSM) positioning and assisted GPS (A-GPS) positioning. Mobile units with A-GPS acquire and measure signals from a number of GPS satellites in order to obtain an accurate estimate of their current geographic position. It is well known that precise knowledge of GPS time can greatly improve positioning measurements for higher sensitivity in otherwise poor signal areas, e.g., indoors where a GPS satellite signal may be blocked. Another application would be accurate time stamping of significant events (e.g. alarms and faults) by network entities such that events emanating from the same cause but registered in different entities could more easily be associated through their common time of occurrence.

In some wireless technologies, e.g., CDMA, the transmission timing of all base stations has to be precisely and explicitly synchronized to a common time source, such as Global Positioning System (GPS) originated clock. Such a precise transmission timing clock provides wireless terminals with unrestricted access to precise common timing information without any special additional support. In other technologies, like GSM and TDMA, each base station maintains its own local timing source, which, though precise within its own frame of reference, does not indicate a particular universal time nor align with the timing maintained by other base stations.

Providing precise common timing information for GSM, TDMA or UMTS base stations may require deploying additional units, for example Location Measurement Units (LMUs) in GSM or UMTS, that measure and associate the transmission timing of one or more base stations with a common timing source. The precise association of the local timing of each base station with the common timing source can be passed to mobile units and base stations for deriving accurate timing, according to the common timing source, from the local transmission timing of a particular base station—e.g. the base station serving a particular mobile unit. GSM LMUs tend to require additional hardware and are expensive additions in any wireless network. Moreover, in order to synchronize the transmission timing of every wireless network base station with a common timing source, it may be necessary to deploy a separate measurement unit for every base station, or every few base stations, thereby further increasing cost and deployment time.

Thus, there is a need for precise common timing information distributed throughout wireless networks without requiring high cost measurement units and with no impact or minimal impact to mobile units.

SUMMARY OF THE INVENTION

It is a purpose of the invention to provide precise common timing information to mobile units;

It is another purpose of the invention to improve GPS positioning capability and performance for mobile units;

It is yet another purpose of the invention to provide base stations with an accurate common timing reference without adding significant new hardware or modifying existing hardware.

The present invention relates to a method of providing precise common timing in any wireless communications network that includes at least one timing marker unit with a precision time source, e.g., GPS. Wireless mobile units and/or timing marker units periodically measure transmission timing differences between pairs of neighboring base stations and each provide the measurements to a base station or central network entity. An absolute transmission timing difference (ATD) is determined for each difference measurement. ATDs are collected and combined for each pair of base stations. Timing marker units may also measure timing associations between transmission timing of reference base stations and a common source of time like GPS and provide the associations to a base station (e.g. a reference base station) or central network entity. A timing relationship is developed for all base stations from the combined ATDs, relating non-reference base stations to reference base stations. Timing associations are then extracted for non-reference base stations from the timing relationships with, and the timing associations of, reference base stations.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
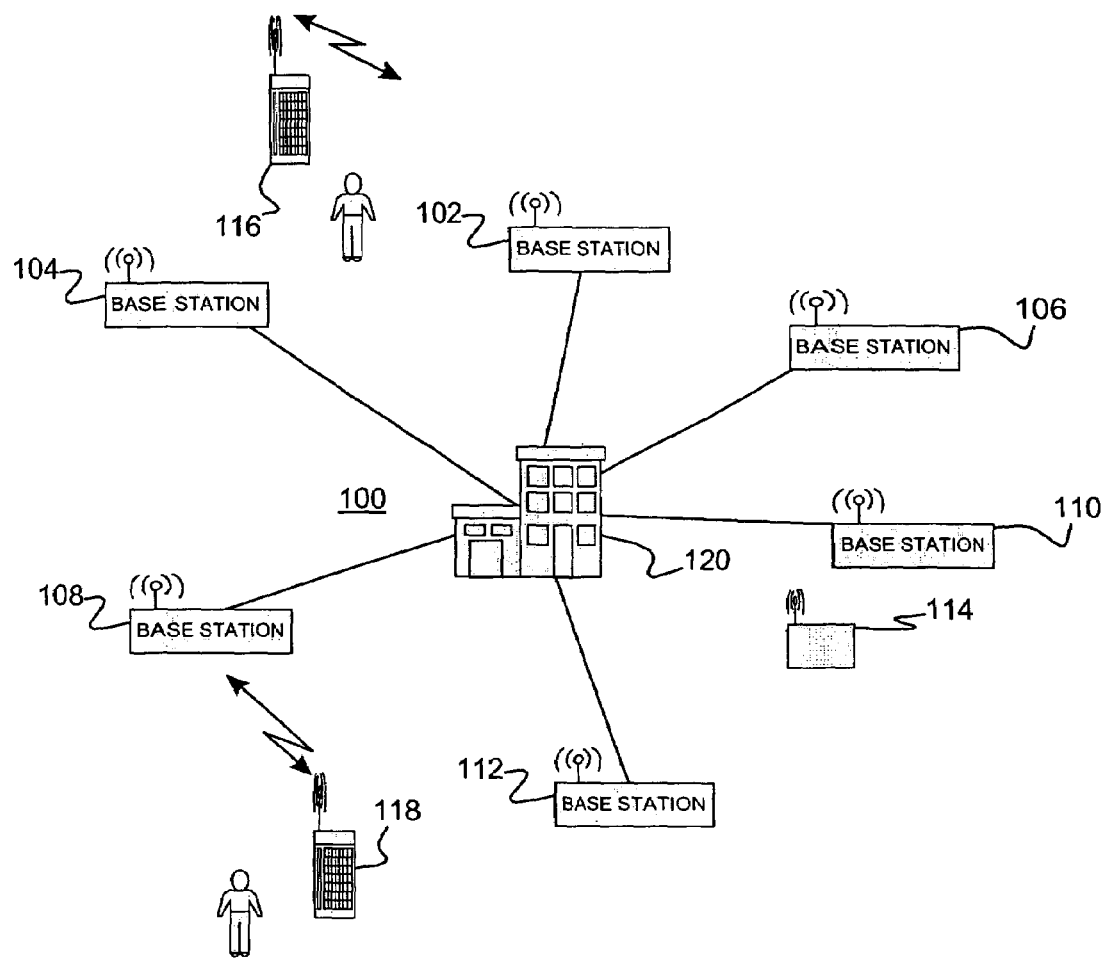
FIG. 1 shows an example of a preferred embodiment wireless network.

Turning now to the drawings and, more particularly, FIG. 1 shows an example of a preferred embodiment wireless network 100 or system, e.g., a Global System for Mobile Communication (GSM) network, a Time Division Multiple Access (TDMA) network, Code Division Multiple Access (CDMA) network or an equivalent network. One or more timing marker units or timing markers 114 at known locations are dispersed throughout the system or subsystem reception area. The wireless network 100 serves mobile stations or units 116, 118 within reception range of at least one of the base stations 102, 104, 106, 108, 110, 112. Mobile units 116, 118 may include cellular phone handsets (cell phones) or other devices with a wireless communications interface, e.g., a computing device such as a personal digital assistant (PDA), laptop computer or tablet computer etc. Base station transceivers (BTS), also commonly referred to simply as "base stations", 102, 104, 106, 108, 110, 112 are connected to a central entity or central network unit 120. The central entity 120 may be a base station controller (BSC) in a base station subsystem (BSS), a Radio Network Controller (RNC) in a Radio Access Network (RAN), or, for a GSM, GPRS (General Packet Radio Service) or UMTS (Universal Mobile Telecommunications System) system, a serving mobile location center (SMLC) or an equivalent. The connection from each BTS to a BSC, SMLC or other central network entity may employ a direct transmission link—for example a wired connection, microwave link, Ethernet connection—or may go via by one or more intermediate entities—e.g. an intermediate BSC in the case of a connection from a BTS to an SMLC for GSM.

Each mobile unit 116, 118 periodically measures the transmission timing difference between pairs of base stations 102, 104, 106, 108, 110, 112. So, for example, mobile unit 116 measures the difference in transmission timing for communication from its serving base station 104 and from one or more neighboring base stations, e.g., 102 and/or 108. Either the mobile unit or, preferably, the base station removes differences attributed primarily to propagation delays between the mobile unit and base station antennas to produce an absolute timing difference (ATD). The absolute timing difference or, ATD, is the difference that would result if external propagation delays (antenna to mobile unit) were all identical, i.e., if the antenna of base stations 102, 104, and/or 108 were all co-located or if the mobile unit was equidistant from both base station antennas.

The measurements may be expressed in the transmission units and sub-units of the particular wireless technology. For example, normally, the overall frequency band for any GSM wireless operator is divided into 200 kilohertz (KHz) physical channels. Within each 200 KHz physical channel, the base station transmits at a defined fixed rate of approximately 270.833 Kbits/second. The overall transmission bit sequence can contain short periods of silence equivalent to the transmission time of a certain number or fraction of bits and is organized hierarchically into frames and various assemblages of frames. The longest assemblage of frames in GSM, the hyperframe, contains 2,715,648 individual frames numbered consecutively from 0 up to 2,715,647. Each frame contains 8 timeslots and each timeslot normally is of duration 156.25 bits. Timeslots within a frame are likewise numbered from 0 up to 7 and bits within a timeslot are numbered from 0 up to 156, where bit numbers between 0 and 155 represent whole bits and bit number 156 represents the final 0.25 bit time in a frame. Quarter bit periods are also numbered in each time slot from 0 through 624. The quarter bit period is the smallest explicitly maintained transmission interval in GSM and is equal to $12/13$ microseconds. So, in a GSM network the measured difference may be in bits and fractions of a bit or in frames, timeslots, bits and fractions of a bit or in assemblages of frames (multiframes), frames, timeslots, bits and fractions of a bit. Similarly, in a CDMA network, the measured difference may be in chips and fractions of a chip rather than in bits. In other wireless networks, other units are possible and, moreover, the units in a particular wireless network may be converted into other equivalent units—for example, frames, timeslots and bits in GSM may be converted into an equivalent duration in seconds and a fraction of a second. In addition, while transmission from a base station may both convey and conform to a particular timing reference as in GSM, it would be possible for a base station transmission to convey a timing reference but not conform to it (e.g. it might conform to some other timing reference that was maintained locally by the base station but not explicitly conveyed). It is to be understood in the context of the invention described herein that a transmission timing reference may simply be conveyed by a base station but not necessarily conformed to.

Preferably, after extracting ATDs from mobile units 116, 118, each serving base station 102, 104, 106, 108, 110, 112 aggregates or combines the ATDs for each pair of base stations, e.g., 102 and 104, 104 and 108. ATDs for a particular pair of base stations may be combined either with a running average (N-sample or over time period τ) or a running weighted average. Each serving base station 102, 104, 106, 108, 110, 112 provides the aggregated ATDs to the central entity 120. Alternatively, the serving base stations 102, 104, 106, 108, 110, 112 provide the ATDs directly to the central entity 120, which then aggregates or combines the ATDs.

Each timing marker 114 periodically measures the transmission timing reference received from nearby base stations, for example from base station 112. Typically, each base station 102, 104, 106, 108, 110, 112 maintains counters (not shown) indicating a count for the current transmission with count numbers for each timing unit of the particular communications technology. Thus, in GSM, each base station has a frame number counter, a time slot number counter, a bit number counter and quarter bit number counter. These counters increment according to timing information derived internally from a single local frequency source with absolute accuracy better than 0.05 parts per million (ppm). The base station also uses the same frequency source to generate the transmission frequency, e.g., 850 or 1900 MHz in North America and 900 or 1800 MHz elsewhere. The same counters are associated with all of the 200 KHz physical channels supported by the base station, synchronizing local transmission from that one base station. The counters are also explicitly and implicitly conveyed by each base station in certain control channels—for example the GSM Synchronization channel—so, after a period of monitoring transmission from any base station any timing marker or mobile unit is able to derive the exact counter values in the transmission arriving from that base station. Maintaining these counters and their application synchronized to base station transmission frequency provides a local GSM timing reference at the base station which can be measured by both timing markers and mobile units.

Thus, the timing marker 114 obtains an exact timing reference from any nearby base station 102, 104, 106, 108, 110, 112. By measuring a common timing source, such as GPS time, the timing marker 114 obtains a precise association between the common timing source and the local transmission timing of each of nearby base stations 102, 104, 106, 108, 110, 112. The timing marker 114 can adjust this association to allow for the known or measured transmitted signal propagation times from nearby base stations 102, 104, 106, 108, 110, 112, either adding to the transmission timing reference the measured propagation time from the corresponding base station or, subtracting the propagation time from the common time reference. This associates nearby base station transmission timing with the common time reference for, respectively, either the current measured time or the initial transmission time from the base station 102, 104, 106, 108, 110, 112. This time association can be returned to the central network entity 120.

In another embodiment, the timing marker 114 provides the central network entity with the measured transmission timing from the nearby base station associated with common time without adjusting for the propagation time from the base station. In this embodiment, the central network entity 120 makes the adjustment instead of the timing marker 114. Alternately or in addition, the timing marker provides the timing association to the central network entity periodically, in response to a specific command or when certain changes were discerned in the timing association. For example, an observed timing drift relative to the common time reference and in excess of a threshold for a nearby base station may trigger passing the timing association from the timing marker 114 to the central network entity 120. It should be noted that additional adjustment or compensation is unnecessary for common GPS time reference propagation time from a particular GPS satellite. Additional compensation or adjustment is unnecessary because normal GPS time derivation already takes into account the position and motion of any GPS satellite as well as the location (either known in advance or computed from GPS satellite measurements) of the GPS receiver, for example in the timing marker 114.

The central entity 120 uses the aggregated ATDs from the mobile units 116, 118 and the associations of transmission timing to common time from timing markers 114 to derive associations of transmission timing with common time for all base stations 102, 104, 106, 108, 110, 112. The associations are then provided to mobile units 116, 118 and base stations 102, 104, 106, 108, 110, 112 periodically, on request or, when needed to support a particular application.

Mobile units 116, 118 continually measure, and base stations 102, 104, 106, 108, 110, 112 continually extract ATDs and forward the ATDs to the central entity 120. The central entity 120 may aggregate ATDs and combine them with timing associations provided by the timing marker 114. Then, the central entity 120 provides the resulting timing associations to particular base stations 102, 104, 106, 108, 110, 112 and mobile units 116, 118. For example, the central entity 120 may provide mobile unit 118 with the association between the transmission timing of its serving base station 108 with common time. This association applies at the base station 108. If the mobile unit 118 has or, can measure, the propagation time to the serving base station 108, the mobile unit 118 can add the propagation time to the common time reference to obtain a precise common time reference from that association valid at its own location.

In GSM, for example, the propagation time can be obtained from the timing advance value supplied to a mobile unit (e.g., 116) by its serving base station (e.g., 102). The mobile unit 116 uses the timing advance value in normal GSM to synchronize its transmission timing to that of its serving base station 102. Since the timing advance value is twice the propagation time between the mobile station 116 and its serving base station 102, it can also be used to obtain the propagation time. The central entity 120 may also provide a base station (e.g., 102) with the association between the transmission timing from the base station 102 and the common time source. Thereafter, the base station 102 can use this association to derive the precise common time from the value of its current transmission timing reference.

Figure 2:
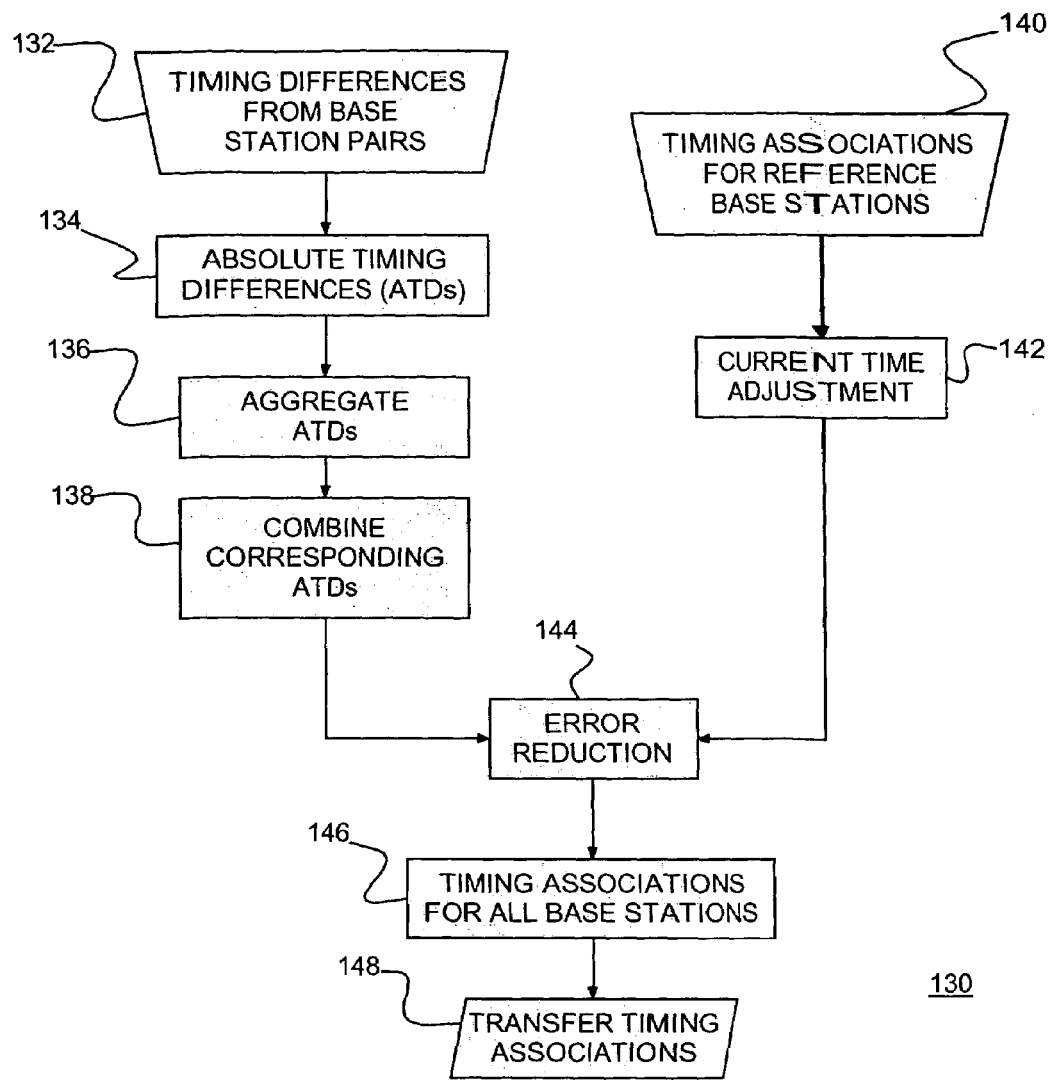
FIG. 2 shows an example of a precision time keeping flow diagram with reference to the wireless network of FIG. 1.

FIG. 2 shows an example of a flow diagram 130 of precise common time keeping in a wireless network according to a preferred embodiment of the present invention with reference to the example of FIG. 1. The precise common time keeping method of the present invention obviates the need for widespread deployment of a common clock source, e.g., from a local Global Positioning System (GPS) receiver. For simplicity of illustration of this example, the first, serving or current base station is represented in the discussion herein below by base station 104 and the mobile unit is represented by mobile unit 116 unless indicated otherwise. The second or handover base station is taken to refer to base station 102. Further, this is for example only and not intended as a limitation as any base station is a handover base station for any wireless unit entering its reception range and may be a serving base station for wireless units in its reception range.

First in step 132 wireless entities or wireless units, e.g., mobile units 116, 118, measure transmission timing differences between pairs of base stations 102, 104, 106, 108, 110, 112, e.g., between each of base station pair 102, 104 or 102, 106. Next in step 134 an absolute timing difference (ATD) is derived for each measured difference to remove the portion of the timing difference corresponding to the difference in propagation time between the mobile unit 116, 118 and each of the base station antennas. The ATDs are extracted from the measured time difference (MTD) and satisfies the relationship $$MTD = ATD + (P2 - P1) \quad (1)$$

where P1 and P2 represent the propagation time between the particular mobile unit, e.g., 116, and each of the base stations, e.g., 102, 108, and where time differences represent transmission timing from the base station associated with propagation time P1 less the transmission timing from the base station associated with propagation time P2. In step 136 the ATDs are combined or aggregated, combining ATDs for each base station pair, measured at different mobile units and/or at different points in time. Preferably this aggregation of ATDs occurs in the serving base station 102, 104, 106, 108, 110, 112 for the mobile unit making the measurement. In step 138 ATDs from different base stations and for the same pair are combined, preferably in the central unit 120.

In step 140, timing marker(s) 114 measure the transmission timing of nearby reference base stations (e.g., 112) and timing from a common time source such as GPS. The timing marker 114 derives a timing association between each measured reference base station and the common time source. Preferably, the timing marker 114 adjusts the timing association(s) to compensate for the propagation time from each measured reference base station 112 unless the timing marker is co-located with a reference base station in which case no compensation is needed. The timing marker 114 provides the adjusted timing associations to the central network entity 120. Next in step 142, the adjusted timing associations are updated to the current time by adding to each associated transmission timing reference and common time reference the amount of time that has elapsed since the measurements were made. Preferably, all timing associations are updated to the same common time reference. In step 144, ATD errors and/or timing association errors are reduced, e.g., graphically or using weighted averages, as described herein below. In step 146, the central entity obtains a timing association between the transmission timing of each non-reference base station 102, 104, 106, 108, 110 and common time from the ATDs and the timing associations for the reference base stations 112. In step 148, the central entity 120 provides the timing associations for non-reference base stations (e.g. the base station 108) to base stations (e.g. the base station 108) and/or mobile units (e.g. the mobile unit 118).

The transmission timing differences measured in step 132 can be expressed either as a complete time value or a relative time value, relative to some transmission timing sub-unit. A complete time value expresses the complete time difference—for example, the number of GSM frames, timeslots, bits and fractions of a bit by which the transmission timing of one base station differs from that of another base station. A relative timing difference expresses the difference relative to and as a fraction of some sub-unit of transmission—for example a frame or a timeslot in GSM—and omits the portion of the complete time difference that contains a whole number of these sub-units.

For example, a GSM mobile unit (e.g., 118) observes a base station 108 to send the start of bit 57 of timeslot 3 in GSM frame 2395 and, at the same time observes base station 112 to have sent a fraction 0.78 of bit 23 of timeslot 7 in GSM frame 35704. The mobile unit 118 can compute the complete transmission timing difference to be the time B from base station 112 less the time A from base station 108; which is 33309 (=35704−2395) frames, 4 (=7−3) timeslots, −34 (=23−57) bits and a fraction, 0.78 (=0.78−0.0) of a bit. Re-expressing this resulting difference using only positive values and since one timeslot normally contains 156.25 bits; the positive (complete time) difference is 33309 frames, 3 timeslots and 123.03 bits. However, the difference relative to a single GSM frame, omitting the number of whole frames (33309) results in a difference of 3 timeslots and 123.03 bits. Relative to a GSM timeslot, the difference further reduces to just 123.03 bits. Similarly, the complete time difference may be expressed using a single time unit for the wireless technology, e.g., converting the above complete difference example to bits results in 41,636,841.78 bits. Further, any N bit sub-unit may be selected for a modulo N conversion of a complete time difference to a relative time difference for this sub-unit, e.g., for N=256, the relative difference (41,636,841.78 modulo 256) is 233.78 bits.

Also, the difference measurements may be made under a number of different conditions. In a state of the art GSM system, for example, any mobile unit can perform a timing measurement during handover from one "old" base station to another "new" base station, if ordered to do so by the old base station. The handover measurement provides the difference in transmission timing between the old and new base stations. This transmission timing difference provides the difference in the timing of the two base stations in half bits, relative to (modulo) $2^{21}$ half bit periods and, thus can be accurate to plus or minus one quarter of a bit (i.e. approximately plus or minus 1 μs). Also a typical state of the art GSM system can instruct mobile units that support the well known enhanced-observed timing difference (E-OTD) positioning method to measure the timing difference between the serving base station and certain neighboring base stations. This positioning timing difference is expressed relative to only a single GSM time slot in bits and fractions of a bit with a best case resolution of $\frac{1}{256}$ bit (around 0.014 μs). As is well known in the art, however, an E-OTD capable GSM mobile unit normally has a best accuracy of around $\frac{1}{32}$ of a bit (around 0.12 μs). In a typical state of the art UMTS network, the serving base station can instruct mobile units to measure the timing difference between itself and certain neighbor base stations in support of the well known Observed Time Difference Of Arrival (OTDOA) positioning method. This UMTS OTDOA measurement has a timing difference accuracy of around 0.13 μs and can be sent periodically by a mobile unit or whenever the timing difference changes by some preset value. In addition to handover or positioning measurements, mobile units could measure timing differences between base stations under many other conditions including, but not limited to, change of serving cell without handover, periodic measurement, change of timing difference by a preset value and measurement ordered by the network for the specific purpose of obtaining and maintaining precise common timing information.

As noted herein above, the absolute time difference determined in step 134 is the time difference that would be observed by the mobile unit if the propagation delay from each base station was the same—for example, if the two base stations (or, more exactly, the antennas of the two base stations) were at the same location or if the mobile station was equidistant from both base stations. The well known equation (1), above, shows the necessary adjustment to the measured time difference to obtain the absolute time difference between two base stations. Whenever the propagation delay between the mobile unit and both of the base stations can be determined, the measured time difference can be used (preferably, by the particular mobile unit) in the above equation (1) to determine the absolute time difference, which may then be provided to the serving base station. Otherwise, if only the propagation delay between the mobile unit and one base station is known in the mobile unit; then, part of the adjustment can be performed in the mobile unit. For example, if the propagation delay between the mobile unit and base station associated with P1 is known, then, using the above terminology, the mobile unit can provide the value of (MTD+P1) to the serving base station. Then, according to equation (1), the value for P2 is subtracted by the serving base station to obtain the ATD. Otherwise, without at least this partial adjustment in the mobile unit, the serving base station would need to obtain the values for both P1 and P2 to calculate the ATD from the provided MTD.

This partial adjustment can be used in a GSM system, for example, when the current base station (104) transmission signal becomes blocked or is severely attenuated or, when the mobile unit 116 is ordered to perform handover from an old serving base station 104 to some new serving base station 102. The propagation delay to the base station 104 is determinable from the GSM timing advance value used to synchronize transmission from the mobile unit 116 to transmission from the base station 104. The timing advance value has a typical best accuracy of ½ bit (around 2 μs) in GSM and is double the propagation delay, making derivation of the propagation delay (with a best accuracy of around 1 μs) straightforward. For a specific type of GSM handover, known as pseudo-synchronized handover, the mobile unit 116 always provides this partially adjusted value to the new serving base station 102. For other types of GSM handovers the partially adjusted value can be determined and forwarded if ordered by the old base station 104. Then, similarly, after the handover the new base station 102 can obtain the value for the second propagation delay (P2) from the new timing advance value. The new serving base station 102 can thus obtain the absolute time difference between itself and the old base station 104. In a variant of the GSM measurement method, the mobile unit 116 waits until after the handover to the new base station 102 and it obtains a new timing advance value to the new base station 102. The mobile unit 116 then obtains the propagation delays to both the old and the new base stations 104, 102 and, thereby, obtains the absolute time difference before sending this difference to the new base station 102.

Optionally, each base station 102, 104, 106, 108, 110 can pass the ATDs between it and its neighboring base stations directly to the central entity 120 for combination/aggregation. This approach works well when network signaling resources can handle the higher signaling requirements for passing the raw/unaggregated ATDs to the central entity without interfering with other network signaling traffic and, when the central entity has the number crunching capability to handle the very large number of received ATD measurements.

Otherwise, preferably, in step 136 the serving base station 102 combines/aggregates the ATDs for each pair of base stations that it receives or derives from different mobile units into a single statistically averaged value. Each aggregate ATD is forwarded to the central entity 120 in any of a number of ways. For example, the serving base station 104 stores each ATD value that it receives or derives for a pair of base stations (e.g., 102, 106). The number of values stored may be for a certain period of time or until a certain number of values have been stored. Then, the base station 104 calculates the arithmetic average of all the stored values and transfers this average to the central entity. When the base stations have the local capacity to store a large number of measurements, the base stations may collect and transfer statistics on the variability of the values that have been averaged. For example, the base station can include the variance or standard deviation of the values and the number of them, to indicate to the central entity the accuracy and reliability of the average value. This option requires minimal change in the time difference between two base stations during the measurement storage. Such changes impair accuracy because the earlier measurements may not accurately reflect the change compared to later (post change) measurements.

However, preferably, the ATDs are aggregated using a moving weighted average. As is well known in the art, a moving weighted average can be obtained for N samples by applying a weight (w) to each of the samples according to the following equations:

$$\underline{ATD}_1 = ATD_1 \quad (2)$$

$$\underline{ATD}_{n+1} = (1-w)\underline{ATD}_n + w\, ATD_{n+1} (n \geq 1) \quad (3)$$

Where $ATD_n$ is the $n^{th}$ measurement ($n \geq 1$) of absolute time difference received or derived from a mobile unit, $\underline{ATD}_n$ is the moving weighted average of $ATD_i$ measurements for i=1 to N, and for the weight w where 0<w<1.

A low weight value (w close to zero) is used if the absolute time difference between base stations changes only very slowly, which it normally does in wireless networks since base station timing is required to be extremely precise and stable. A higher value (w closer to 1) might be used if the time difference could change significantly over a short period. The variability and reliability of the moving weighted average can also be expressed using the standard deviation or variance of the values of ($\underline{ATD}_n - ATD_{n+1}$) in the above equations. ATD averaging or weighted averaging may be done at any convenient point in the network. For example, if the central entity 120 has the capacity to perform the averaging, the individual ATD measurements may be forwarded directly to the central entity 120. In this example, the base stations may provide measured or absolute timing differences to the central entity 120.

An SMLC serving as the central network entity 120 and certain mobile units may be capable of supporting the E-OTD positioning method. The measured (or "observed") GSM time differences are then passed to the SMLC central entity 120 which obtains and aggregates the individual ATDs as described herein above. If the central network entity 120 obtains the position of any mobile unit (e.g. 116), for example, using the E-OTD positioning method or any variant of it or another method like GPS; then, the central entity 120 may convert a measured E-OTD time difference between two base stations (e.g., 102, 104) into an ATD value by obtaining the propagation times between the mobile unit 116 and each base station 102, 104 from their known positions and applying equation (1). The derived ATD may be more accurate than that obtained from measurements made during handover, because of higher accuracy of both E-OTD measurements and propagation times calculated from position estimates.

An SMLC, base station or Radio Network Controller serving as the central network entity 120 in a UMTS network and certain mobile units may be capable of supporting the OTDOA positioning method. The measured (or "observed") OTDOA time differences between base stations are then passed to the SMLC, base station or Radio Network Controller central entity 120 which obtains and aggregates the individual ATDs as described herein above. If the central network entity 120 obtains the position of any mobile unit (e.g. 116), for example, using the OTDOA positioning method or any variant of it or another method like GPS; then, the central entity 120 may convert a measured OTDOA time difference between two base stations (e.g., 102, 104) into an ATD value by obtaining the propagation times between the mobile unit 116 and each base station 102, 104 from their known positions and applying equation (1).

An ATD value that is obtained from either E-OTD or OTDOA measurements may be more accurate than one obtained using, for example, measurements made during handover. For example, in GSM the measured time difference between two base stations that is provided during handover has a best accuracy of around 1 µs as noted hereinabove. The propagation delay adjustment in equation (1) to obtain an ATD may introduce further errors. For example, in GSM, the propagation delays, P1 and P2, in equation (1) will typically have a best accuracy of around 1 µs each as described hereinabove. If the errors for the 3 quantities MTD, P1 and P2 in equation (1) are independent with standard deviations matching these accuracy values (i.e. 1 µs), then by a well known result in statistics, the standard deviation of the error for the resulting ATD is 1.73 µs. While this error may be reduced by aggregation and combination of ATDs as descibed hereinabove for steps 136 and 138 and by further error reduction in step 144, it is possible that significantly more accurate ATD values may not be possible.

However, the measured time differences provided by E-OTD and OTDOA have a best accuracy of around 0.12 µs and 0.13 µs, respectively, as already noted. If the propagation delay adjustment in equation (1) can be of similar accuracy, then the error in the resulting ATD will be much lower than for an ATD obtained using handover. To ensure this, the position of a mobile unit for GSM, GPRS or UMTS may be obtained using GPS or Assisted GPS (A-GPS). Preferably, the position of the mobile unit is obtained at the same time as the mobile unit makes E-OTD or OTDOA measurements by performing both positioning related tasks in parallel. Provided the mobile unit is in an outdoor environment with visibility to much of the sky (e.g. at least 50% of the sky), the position error for GPS or A-GPS, as is well known in the art, is normally in the range of 5 to 25 meters. Moreover, as is well known in the art, the mobile unit can verify that this level of accuracy is achieved. Since the positions of base stations can be known exactly, the errors in each of the propagation delays P1 and P2 in equation (1) obtained from the GPS or A-GPS position estimate can be in the range of 0.017 to 0.083 µs. If this range is taken as the range for the standard deviation of the errors in P1 and P2, and if the standard deviation of the error in the measured time difference MTD in equation (1) is 0.13 µs (i.e. approximately matching the best accuracy for OTDOA or E-OTD measurements), then the standard deviation of the error in the ATD value obtained using equation (1) will lie in the range 0.13 µs to 0.18 µs. This error range is around 10 times less than that shown hereinabove for derivation of ATD values using GSM handover. These more accurate ATD values can be used to provide more accurate common timing associations as described hereinbelow.

Accurate ATD values, as is well known in the art, may also be used to support E-OTD and OTDOA positioning of other mobile units for which GPS or A-GPS positioning is not possible or not accurate because the mobile unit does not support such positioning or is located where GPS signals are highly attenuated (e.g. inside a building). The ATD values used to support such positioning are obtained, as described hereinabove, from mobile units in the same vicinity for which accurate GPS or A-GPS is possible. In particular, these highly accurate ATD values are obtained using mobile units only and without the need for expensive measurement units such as LMUs or timing markers. Thus, E-OTD or OTDOA positioning is supported without special additional hardware in the network.

Accurate ATD values may also be used to synchronize base station timing more accurately using a method such as is disclosed in U.S. patent application Ser. No. 10/410,843, entitled "Base Station Synchronization in a Wireless Network" to Stephen William Edge, filed Apr. 10, 2003 and incorporated herein by reference. In particular, for GSM, GPRS or UMTS, the accuracy of ATD values obtained from E-OTD or OTDOA measurements combined with GPS or A-GPS positioning can be ten times greater than ATD values obtained from GSM handover measurements as described hereinabove. If the only errors in synchronization are due to errors in ATD values, then synchronization resulting from the former ATD values will be significantly more accurate than that resulting from the latter values.

When ATD values are obtained from more than one source, for example in GSM from both measurements provided by handover and measurements provided using E-OTD, then the accuracy of the ATD values from the different sources may differ significantly as described hereinabove. ATD values may then be averaged in step 136 and/or step 138 with a higher weight assigned to the more accurate values—for example using a weight that is inversely proportional to the expected variance in the error of each ATD value. The resulting averaged ATD value will then remain more accurate than the individual ATD values with the higher accuracy, by a well known result in statistics.

In addition to measuring timing associations, each timing marker 114 can measure the timing differences between one and, preferably, many pairs of nearby base stations 102, 104, 106, 108, 110, 112. The timing markers 114 can then either forward the difference measurements or use equation (1) to extract the ATDs from the measured time differences. Since the distance between any timing marker 114 and each nearby base station 102, 104, 106, 108, 110, 112, can be known in advance, the propagation delays can be derived fairly easily. For example, GSM systems with a GSM SMLC central network entity are capable of supplying such measurements from location measurements units (LMUs) in place to support E-OTD positioning. However, typical LMUs for E-OTD do not normally support precise common timekeeping.

Once the central entity has in its possession average values for the absolute time differences between different pairs of base stations; in step 138 it can perform further averaging of the time differences between different pairs of base stations to yield still more accurate and reliable values. In the simplest case, the central entity 120 may have been provided with, or have itself obtained, the average absolute time difference between some base station 104 and some other base station 102 as expressed with base station 102 time subtracted from base station 104 time. The central entity 120 may also have obtained or been provided with the time difference expressed as base station 104 time subtracted from base station 102 time. This would occur for example, if time differences were derived using pseudo-synchronized GSM handover capability. Mobile units that have just been handed over provide each new serving base station 102, 104, 106, 108, 110, 112 with values for the timing of a neighbor base station (the previous serving base station) less its own. In this example, each of the two neighboring base stations, e.g., 102, 104, would provide the central entity 120 with a distinct (possibly different) value for the time difference between them but expressed with opposite arithmetic signs. Other base stations 106, 108, 110, 112 (or mobile units or timing markers directly) may provide other values for this time difference. To achieve a more accurate single value for the time difference between the pair of base stations 102, 104, the central entity 120 may simply average all received ATD values for the particular pair, ignoring any arithmetic sign difference. However, preferably the central entity 120 performs a weighted average of the received ATD values with a higher weight assigned to any value with a lower variation (e.g., with a lower standard deviation or variance) or obtained from a higher number of component measurements. Using a well known statistics principles applicable to averaging of independent random variables, each ATD value is weighted inversely proportional to its variance to obtain the most accurate weighted average.

For very small ATD differences between a pair of base stations (e.g., if the base stations are synchronized), an arithmetic sign change may be due to error as well as which base station's time was subtracted from the other. So, if the central entity 120 knows which base station's time was subtracted from the other base station's time, it can change the sign of values where needed so that the same base station's time is subtracted for all values. The absolute time difference values may then remain signed and can be averaged with the sign included.

Similarly, in step 140, timing markers (e.g., 114) at known locations in the wireless network, measure the transmission timing relationship for reference base stations, such as base stations 112, with a precise common time reference, e.g., GPS. The timing markers may be separate physical entities, such as for example a GSM, GPRS or UMTS LMU, or part of another network entity such as a base station, or separate from but co-located with a base station. Preferably, the network includes much fewer timing markers than base stations. For example, in a network of less than 100 base stations, no more than one timing marker for each ten base stations; in a larger network with more than 1000 base stations, one timing marker to fifty base stations. Preferably, however, a minimum of two timing markers are included in even the smallest network for redundancy, so if one timing marker is out of commission (e.g., fails or needs maintenance) the other timing marker is still functioning to supply timing associations. Also, a preferred wireless network is partitioned into separate geographic regions, each region containing approximately the same number of base stations and with one or two timing markers inside each region. This partitioning ensures that no base station is too distant from at least one timing marker and facilitates more accurate timing data for the base stations. Optimization of the number and distribution of timing markers may also occur taking into account the greater accuracy and reliability provided by more timing markers versus the extra cost of deploying and maintaining them.

Restricting the number of timing markers is preferred when timing markers form part of the wireless network—for example, are part of a reference base station or are separate physical units like LMUs in GSM, GPRS and UMTS. However, as taught by U.S. patent application Ser. No. 09/971,990, entitled "Method And Apparatus For Wireless Network Timekeeping And Synchronization" to Stephen, W. Edge et al., filed Oct. 4, 2001 and published Apr. 10, 2003 as published application number 20030069033, the contents of which are hereby incorporated by reference, a mobile unit may effectively serve as a timing marker by providing a wireless network, for example a central network entity SMLC, with the timing association between a common time source such as GPS and the transmission timing reference of a nearby base station, for example the base station serving the mobile unit. Further, the timing association so provided may be adjusted for the propagation delay between the base station and mobile unit. If the number of mobile units with the capability to act as timing markers is limited, the wireless network central entity may receive timing associations for only some base stations in the network and not all base stations as would be possible if mobile units with the timing marker capability were located nearby to all base stations. With this limited capability, the central network entity can designate reference base stations to be those limited number of base stations for which timing references are provided by mobile units. Timing associations for other non-reference base stations are then obtained as described hereinbelow. Furthermore, by using mobile units as timing markers, it may be unnecessary to deploy other timing markers, for example LMUs in GSM, GPRS or UMTS, or the number of such other deployed timing markers may be significantly reduced.

Each timing marker has a precision timing source and is capable of receiving transmission signals from one or more base stations and measuring the transmission timing reference (e.g., frame number, timeslot number, bit number and fraction of a bit for GSM) contained in each transmission signal. The timing markers can receive transmission signals wirelessly over an antenna or, in the case of a co-located base station over a wired connection, e.g., coax cable. For example, a timing marker may include a GPS antenna and receiver capable of acquiring, measuring and decoding signals from GPS satellites. Another timing marker may be directly connected to or able to receive signals from some external source of common time—for example a remote GPS receiver or a GPS reference network. A timing marker may also be able to precisely associate the transmission timing reference in transmission signals from a reference base station with the common timing reference at the same precise instant in time. In a GSM association, for example, a transmission timing reference of 73,415 frames, 5 timeslots and 27.2 bits may correspond to a GPS time of day of 21 hours 14 minutes and 39.2075394 seconds. The latest such association may be periodically (every 5 minutes, for example) provided to the central network entity 120, in response to a command or in response to a determination that the transmission timing reference of a reference base station has changed by more than some preset threshold amount from an expected value for perfect timing accuracy based on the last timing association sent to the central network entity.

Upon receiving a new or updated association, the central entity may adjust the association for the propagation time from the base station antenna to the timing marker. The propagation time is determinable from the known distance between the timing marker and the base station antenna divided by the speed of light. This adjustment provides an association between the common time reference and the transmission timing at the base station. The adjustment can be made by either subtracting the propagation time from the common time reference or by adding the propagation time to the transmission timing reference. The former adjustment provides the association that occurred at the base station when the transmission currently being received by the timing marker was first transmitted. The latter adjustment predicts the association occurring at the present time at the base station (that has not yet been observed). Generally, the latter adjustment is preferable because it is slightly more recent than the former, but the difference in result may often be negligible.

In the previous GSM example, for a base station 1000 meters distant from the timing marker, the propagation time is around 0.0000033 seconds. The association computed using the former method results in a transmission timing reference of 73,415 frames, 5 timeslots and 27.2 bits corresponding to a GPS time of day of 21 hours 14 minutes and 39.2075361 seconds. By contrast using the latter method and in GSM timing units (e.g. 1 bit has a duration of 48/13 µs), the association is 73,415 frames, 5 timeslots and 28.1 bits corresponding to a GPS time of day of 21 hours 14 minutes and 39.2075394 seconds. Alternately, the adjustment may be made by the timing marker before transferring the timing association to the central network entity.

In addition, the timing marker may provide the central network entity with statistical timing error information for the reference base stations. Ideally, base stations maintain perfect timing accuracy. The transmission timing reference for an ideal base station can be predicted with precision from any past transmission timing association to common time by using the known relationship between the wireless technology transmission timing units (e.g. frames, timeslots and bits for GSM) and the common time units (e.g. hours, minutes and seconds for GPS). In practice, however, a base station is not ideal and its clock source is not completely accurate. Typically, there is some gradual base station timing drift. The timing marker provides a value or values for determining the accumulated drift at the instant in time when a particular association between transmission timing and common time is obtained and/or at other instants and/or over a period of time. Drift may be expressed in a number of ways. For example, drift may be expressed as the first derivative with respect to common time of the difference between the measured transmission timing and the predicted ideal transmission timing based on some previous timing association. The second derivative, the derivative of the drift with respect to common time may also be provided (giving the rate of change of the drift) to express the rate at which drift is increasing or decreasing. Examples of other error related statistical timing error information that may be determined include the mean and standard deviation of any short term fluctuations or oscillations in the measured transmission timing. The adjusted timing associations for the reference base stations may be stored with any statistical timing error information and with the time of receipt of each piece of information.

In step 142, to obtain the timing association for any reference base station at a later point in time from the most recently received timing association, the elapsed time since receipt of an association may be added to the two associated timing references. Also, if the interval of time from when the measurement was taken to when the measurement was most recently received can be calculated, measured or otherwise estimated, it may be further added to the two associated timing references. Adding these elapsed times provides the predicted timing association for the particular reference base station at the current instant in time. For further accuracy, any error information provided by timing markers may be used to predict the cumulative drift in the transmission timing reference for the particular reference base station from the time of measurement to the current time. The cumulative drift, either positive or negative, may then be added to the predicted transmission timing reference for the reference base station at the current time. For example, if a timing marker reports a positive (increasing) transmission timing drift of a certain reference base station relative to common time of 0.05 parts per million (ppm) and precisely 30 seconds elapses since the last timing association measurement, the central entity adds 30 seconds to the reported common time reference and 30.0000015 seconds (or the equivalent of this expressed in the transmission units for the particular wireless network) to the reported associated transmission timing reference.

Alternatively, the timing associations received in step 140 are adjusted to reflect the current time independent of actual transfer delays from the timing markers, or elapsed time since receipt, using instead, an approximate knowledge of the common time reference. Using a GPS common time reference, for example, it suffices to know the current date and time with a preferable accuracy of around 1 second. A common time reference is chosen that either reflects the current time instant or a time instant a few seconds in the past or future. Then, an adjustment to the transmission timing portion of the timing association for any reference base station is calculated equal to the difference between the common time reference portion of this association and the common time reference chosen by the central entity. The calculated adjustment is converted, if necessary, from the time units for the common time reference to the time units of the transmission time reference. Then, the converted adjustment is added to the transmission timing reference for the reference base station to yield a new transmission timing reference associated with the chosen common time reference. This new transmission timing reference is accurate if the reference base station maintains precise timing. If the reference base station does not maintain precise timing (e.g. gradually increasing or decreasing relative to the common time reference), the statistical error information provided by the timing markers may be used to determine a further adjustment for the transmission timing for this reference base station, e.g., its drift and rate of change of drift.

Having obtained timing associations for certain reference base stations from the timing markers and absolute timing differences (ATDs) between pairs of base stations from the mobile units, the errors in one or both sets of measurements are reduced in step 144, e.g., graphically and using averaging.

Figure 3:
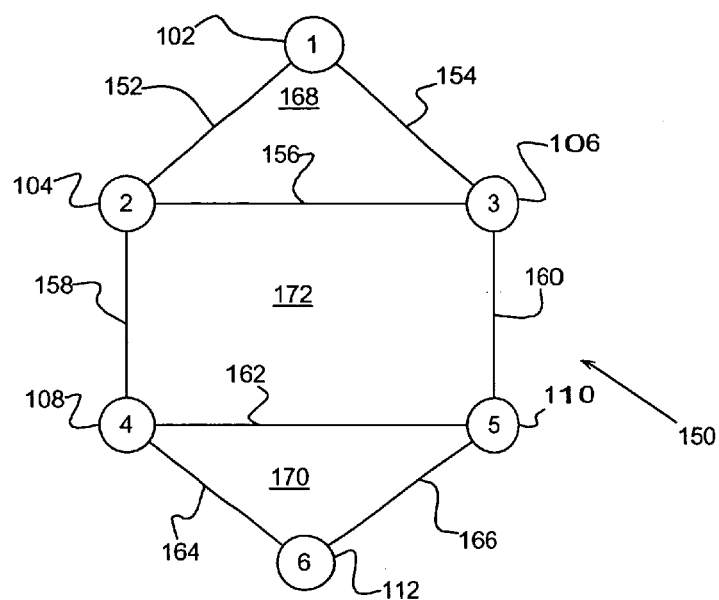
FIG. 3 shows a graphical example of a method of averaging the ATDs in the system of FIG. 1.

FIG. 3 shows a graphical example of a method of reducing errors, for the ATDs in the system of FIG. 1 with each of the base stations 102, 104, 106, 108, 110, 112 represented as nodes labeled 1, 2, 3, 4, 5, 6 in the network graph 150. In this example, the central entity 120 can average the values between the same pair of base stations as described hereinabove. Each ATD is represented by a link 152, 154, 156, 158, 160, 162, 164, 166, which denotes the availability of an averaged measurement of the absolute timing difference that has been obtained between the pair of base stations connected. Then, values can be averaged around various closed loops 168, 170, 172 in the network graph 150. In this example, the closed loop 168 contains the links 152, 154 and 156; the closed loop 170 contains the links 162, 164 and 166; and the closed loop 172 contains the links 156, 158, 162 and 160.

The time differences in traversing a path around any closed loop 168, 170, 172 add up to zero, provided they are measured correctly and consistently (e.g. with time differences expressed as the difference of each succeeding base station's timing in the loop less that of the previous base station). For example, in the loop 168 for a path from base station 102 to base station 104 to base station 106 and back to base station 102, with each base station time being identified by a subscript for the corresponding number in each node:

$$(T_2-T_1)+(T_3-T_2)+(T_1-T_3)=0 \tag{4}$$

where $T_n$=current timing at base station node $n$
$(1<=n<=6)$ (5)

However, since the averaged measured values of the absolute time differences may contain small errors, the above equation may not hold exactly. Instead, in step 144, the equation can be used to estimate the errors as follows:

Let $T_{ij}$ = measured absolute time difference between base station node $i$ and base station node $j$ (6)
= average of [(measure timing at $j$) − (measured timing at $i$)] and $e_{ij}$ = error in $T_{ij}$ (7)
= $(T_j - T_i) - T_{ij}$ then equation (4) above yields $(T_{12}+e_{12})+(T_{23}+e_{23})+(T_{31}+e_{31})=0$ (8)

Since the values for $T_{12}$, $T_{23}$ and $T_{31}$ are known, equation (8) provides a relationship between the error values $e_{12}$, $e_{23}$ and $e_{31}$ for loop 168. Other closed loops 170, 172 can be used to obtain more relationships between the error values. For example, the two loops 170, 172 containing the base stations 108, 112, 110 and 104, 108, 110, 106, respectively, provide:

$(T_{46}+e_{46})+(T_{65}+e_{65})+(T_{54}+e_{54})=0$ (9)

$(T_{24}+e_{24})+(T_{45}+e_{45})+(T_{53}+e_{53})+(T_{32}+e_{32})=0$ (10)

It should be noted that no other independent equations for the error values can be obtained in the network graph 150 of FIG. 3 using other loops, because every other closed loop that can be obtained is a combination of two or all three of the loops 168, 170, 172 so far considered.

Figure 4:
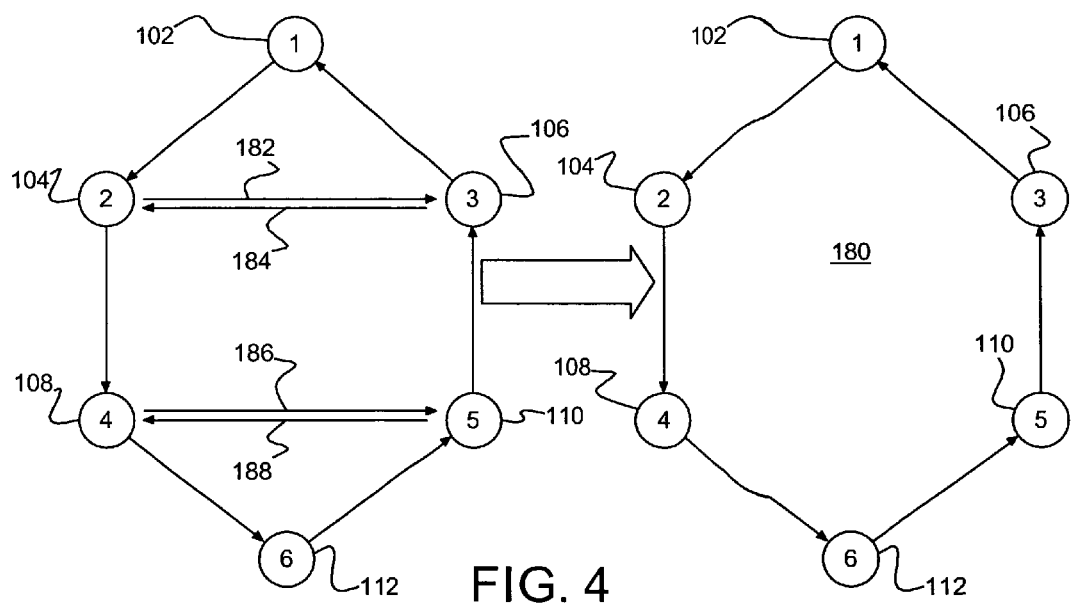
FIG. 4 shows another graphical example of averaging the ATDs in the system of FIG. 1.

For example, consider the closed loop 180 of FIG. 4 from base station 102 to 104 to 108 to 112 to 110 to 106 and back to 102. This is equivalent to combining the 3 previous closed loop paths 168, 170, 172 in graph 150 and removing the links 182, 184 and 186, 188 with two opposite directions of travel. The relationship between the error values in this case is given by:

$(T_{12}+e_{12})+(T_{24}+e_{24})+(T_{46}+e_{46})+(T_{65}+e_{65})+(T_{53}+e_{53})+(T_{31}+e_{31})=0$ (11)

The above equation (11) can be obtained by adding together all three of the previous equations, (8), (9) and (10), and using the fact that for any pair of base station nodes i and j, $T_{ij}$ equals $-T_{ji}$ and $-e_{ij}$ equals $-e_{ji}$. Thus, it can be seen in the above example that while there are eight error values, there are only three independent equations relating them. A solution for all eight error values requires further assumptions. For example, certain pairs of error values could be assumed to be equal. Alternatively, statistics for the ATD values (e.g. provided by base stations or the central network entity) may be used to infer certain relationships between the error values—for example, that one error value is some multiple of another error value.

Figure 5:
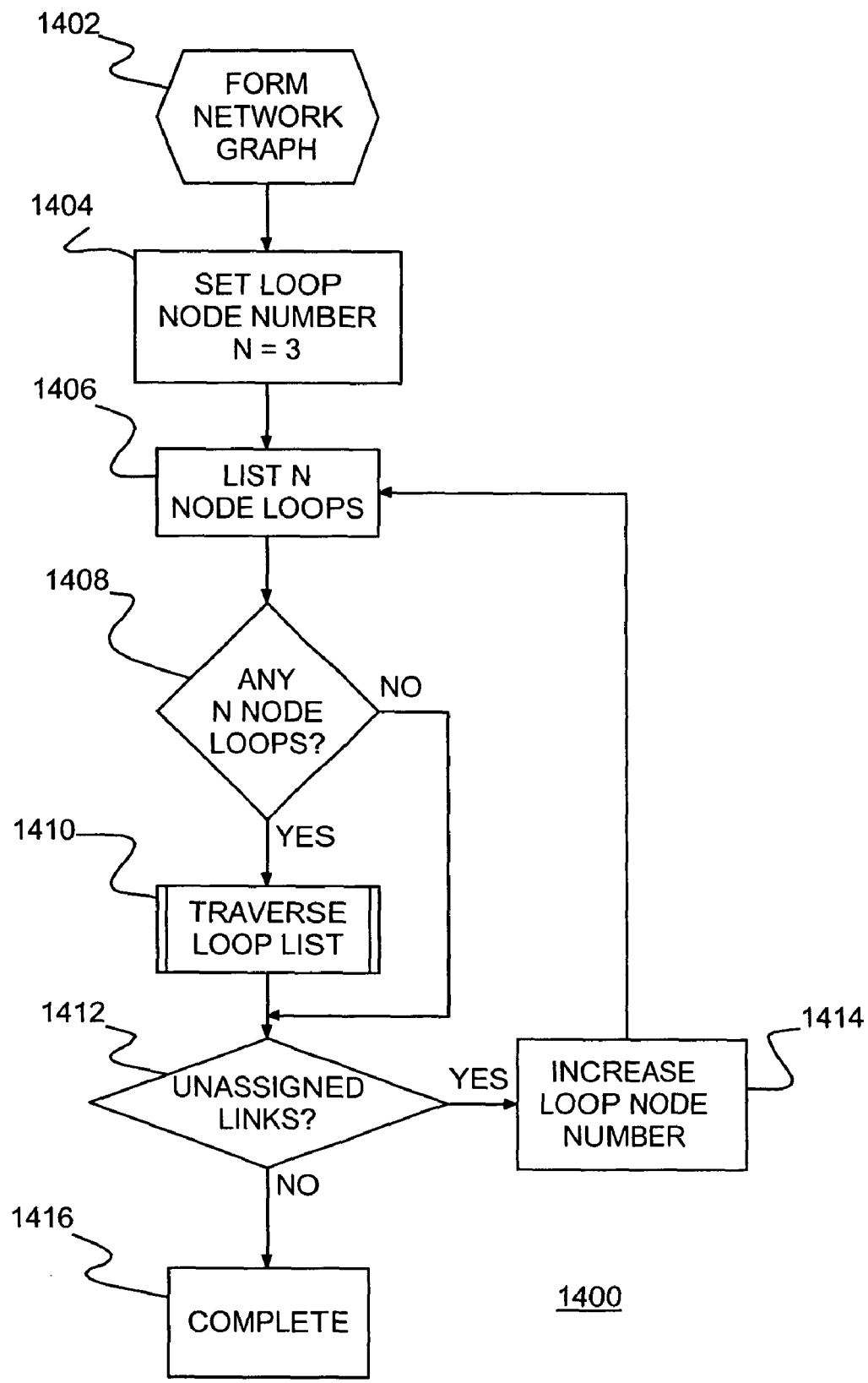
FIG. 5 shows an example of a flow diagram for graphically reducing errors in timing differences between network base stations as in the examples of FIGS. 3 and 4.

FIG. 5 shows an example of a flow diagram 1400 for graphically reducing errors between network base stations as in the examples of FIGS. 3 and 4. First in step 1402, a conceptual network graph is formed, e.g., 150 in FIG. 3, representing base stations as nodes and all available ATD measurements or averaged ATD measurements represented as the links between the corresponding nodes. Then in step 1404, a loop node number parameter is set to the initial value 3. In step 1406, groups of all distinct closed loops containing a number of nodes equal to the loop node number (initially 3) are formed into an ordered list (the list ordering is arbitrary). In step 1408, it is verified whether the resulting list contains any loops (i.e. initially whether any closed loops containing only 3 nodes were found). If not, the following step 1410 is skipped. Otherwise, in step 1410 traversing through the ordered list in descending order, loops with all links appearing in previously traversed loops are removed. When this step is first executed (for loop node number 3), the first and second loops in the list will not contain links that all appear in previously traversed loops and thus will not be removed. But succeeding loops may, in which case they are removed. Each of the remaining listed loops provides one equation relating three error values for its three links. Next, in step 1412 the graph is checked to determine if any links remain that have not been assigned to a traversed loop but could be assigned to a new (non-traversed) loop. If any remain then, in step 1414 the loop node number is increased to 4 and in step 1406 an ordered list is generated of all distinct closed loops containing 4 distinct nodes. If no such loops exist, according to the test in step 1408, step 1410 is skipped. Otherwise, in step 1410, traversing through the ordered list in descending order, all 4 node loops with all links appearing in either any preceding 4 node loop or any of the remaining 3 node loops are removed. Each of the 4 node loops still remaining in the list provides one equation relating four error values for its four links. Again, in step 1412 the graph is checked to determine if any links remain that are not assigned to a remaining loop. If any remain then the loop node number is increased in step 1414 and steps 1406, 1408, 1410 and 1412 are repeated for 5 node loops, 6 node loops and so on until in step 1412 all links in the network have been included in at least one loop or links remain that cannot be assigned to any loop. Once no links or loops remain, in step 1416 the graphical analysis is complete. Thus, the central entity achieves more accurate values for the time differences between base stations and, in particular, more consistent values such that any sequence of time differences around a closed loop sums to the required zero value.

Optionally, steps 1404, 1412 and 1414 can be skipped and iterative step 1406 can be treated as a single non-iterative step of forming an ordered list of all closed loops in the network in a single operation to achieve the same result. This single list is organized such that loops with fewer nodes appear earlier in the list than loops with more nodes. As in the example of FIG. 5, loops with links that all appear in loops earlier in the list are removed from the list.

In the above described examples, any loop can be removed from the lists when all of its links appear in previously considered loops because, for each link in a removed loop, the timing difference error represented by that link can be expressed in terms of the timing difference errors for other links, i.e., in an equation already considered for some prior loop containing that link. Thus, timing difference error equations are redundant for removed loops and could be derived from equations for previously considered loops. However, when at least one link in a loop is not included in any previously considered loop; then, this loop adds a new independent timing difference error equation. The timing error equation includes one timing error variable not appearing in any equation for previously traversed loops.

As a result of the example of FIG. 5, each loop (or each equation) includes at least one unique timing difference error not appearing in any other loop (or other equation) and the first equation has at least three timing difference errors, i.e., is derived from at least three links. So, the number of equations can never exceed the number of timing difference errors less two. In other words, the result always has at least two fewer equations than are required to solve for all errors. So, as noted above, some additional assumptions are needed to solve for all error values. Expressing each additional assumption as an equation involving one or more error values, the number of such equations (if independent) required to solve for all error values equals the number of links (i.e., distinct error values) appearing in the closed loops (i.e., equations) less the number of closed loops (i.e., distinct equations) remaining in the ordered list(s). The above described graphical method of obtaining the errors in the ATD values can be improved further by making use of the timing associations for particular reference base stations provided by the timing markers.

Figure 6:
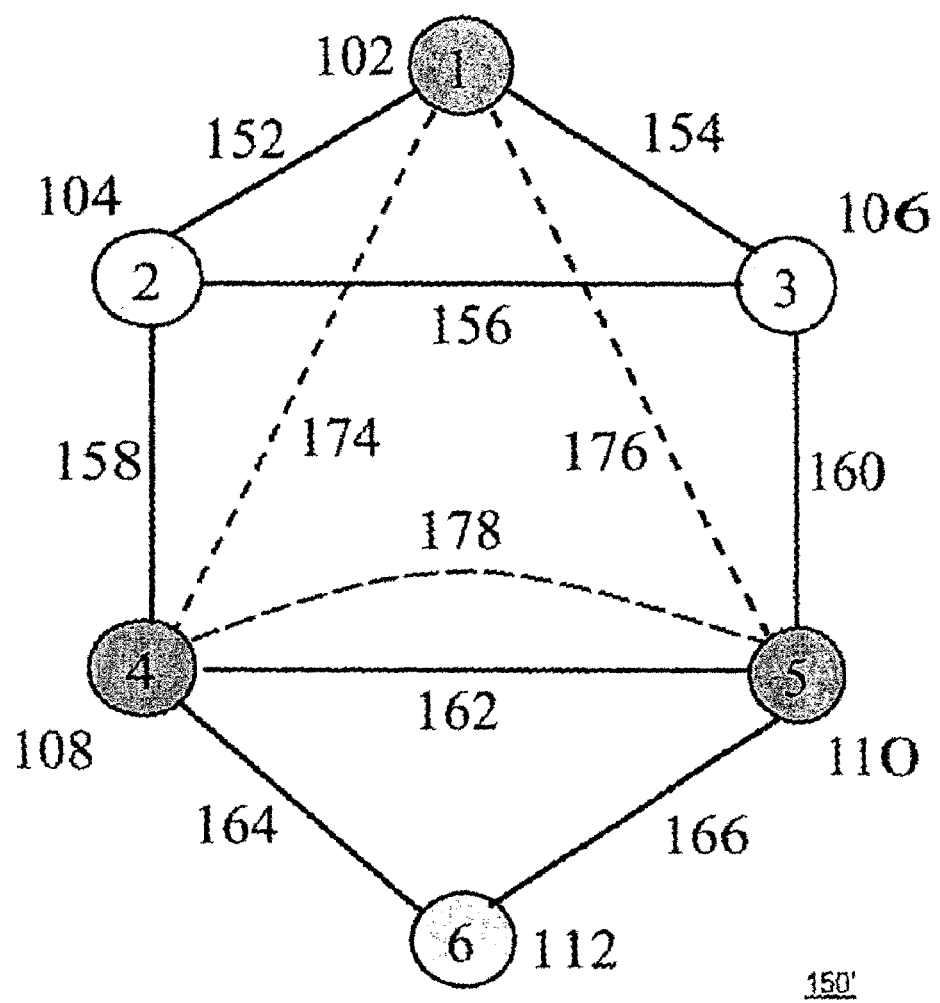
FIG. 6 shows another graphical example of reducing errors in the ATDs in the system of FIG. 1.

FIG. 6 shows the graphical representation of a network 150', substantially similar to the graphical representation of FIG. 3 with timing markers providing timing associations for the reference base stations 102, 108 and 110 represented by nodes 1, 4 and 5, respectively. If the central network entity obtains timing associations for the reference base stations represented by nodes 1, 4 and 5 at the same common time reference—for example the current common time—as described previously for step 142; then, it is possible to derive timing difference ATD values between these base stations from the values of their associated transmission timing references.

Let $T_n^*$ = transmission timing reference for each reference node $n$ associated with the same common time reference where n=1, 4 or 5 (12)

Then $T_{14} = T_4^* - T_1^*$ (13)

$T_{45} = T_5^* - T_4^*$ (14)

$T_{51} = T_1^* - T_5^*$ (15)

In equations (13), (14) and (15), only two of the three derived ADT values are independent, since the third can be derived from the other two (i.e., $T_{14} + T_{45} + T_{51} = 0$). The two independent ATD values so derived effectively add two more links 174, 176 to the network graph 150', and, thus, two further equations for the ATD error values. For example, taking the derived ATD values ($T_{14}$) between nodes 1 and 4 and ($T_{15}$) between nodes 1 and 5 as the two independent ATD values, corresponding additional link 174 between nodes 1 and 4 and an additional link 176 between nodes 1 and 5, respectively, can be considered. An additional link 178 between nodes 4 and 5 cannot be considered in addition, however, because of the dependence of its ATD on the ATDs for links 176 and 178. From new links 174 and 176, two additional closed loops including nodes 1, 2 and 4 and nodes 1, 3 and 5 can be added for the error values. This produces two further equations.

$(T_{12} + e_{12}) + (T_{24} + e_{24}) + (T_{41} + e_{41}) = 0$ (16)

$(T_{13} + e_{13}) + (T_{35} + e_{35}) + (T_{51} + e_{51}) = 0$ (17)

Although in this example, the two additional independent ATD values have provided two additional equations to solve for the error values, $e_{ij}$, they have also added two error values of their own, namely $e_{14}$ (=$-e_{41}$) and $e_{15}$ (=$-e_{51}$), into the equations. Normally, these additional defined relationships would not simplify the analysis because just as many assumptions regarding the error values are needed as before to solve for all error values. However, generally, the timing associations measured and provided by the timing markers are much more accurate than the mobile unit ATD values because the timing markers, which because they are so few, may each be more expensive without appreciably impacting network cost and thus may be more precise than the mobile units. In particular, the timing markers can be specifically designed and optimized for making accurate timing measurements. Therefore, because of this additional accuracy/precision, the errors $e_{14}$ and $e_{15}$, may be assumed to be zero. Thus, equations (16) and (17) reduce to:

$(T_{12} + e_{12}) + (T_{24} + e_{24}) + T_{41} = 0$ (18)

$(T_{13} + e_{13}) + (T_{35} + e_{35}) + T_{51} = 0$ (19)

Equations (18) and (19) do not have error values associated with the two additional links 174, 176 and so, it is possible to solve for the eight original error values using fewer assumptions. Specifically, five equations are now available for eight error values, and so, only three independent assumptions are now needed for the solution.

Figure 7:
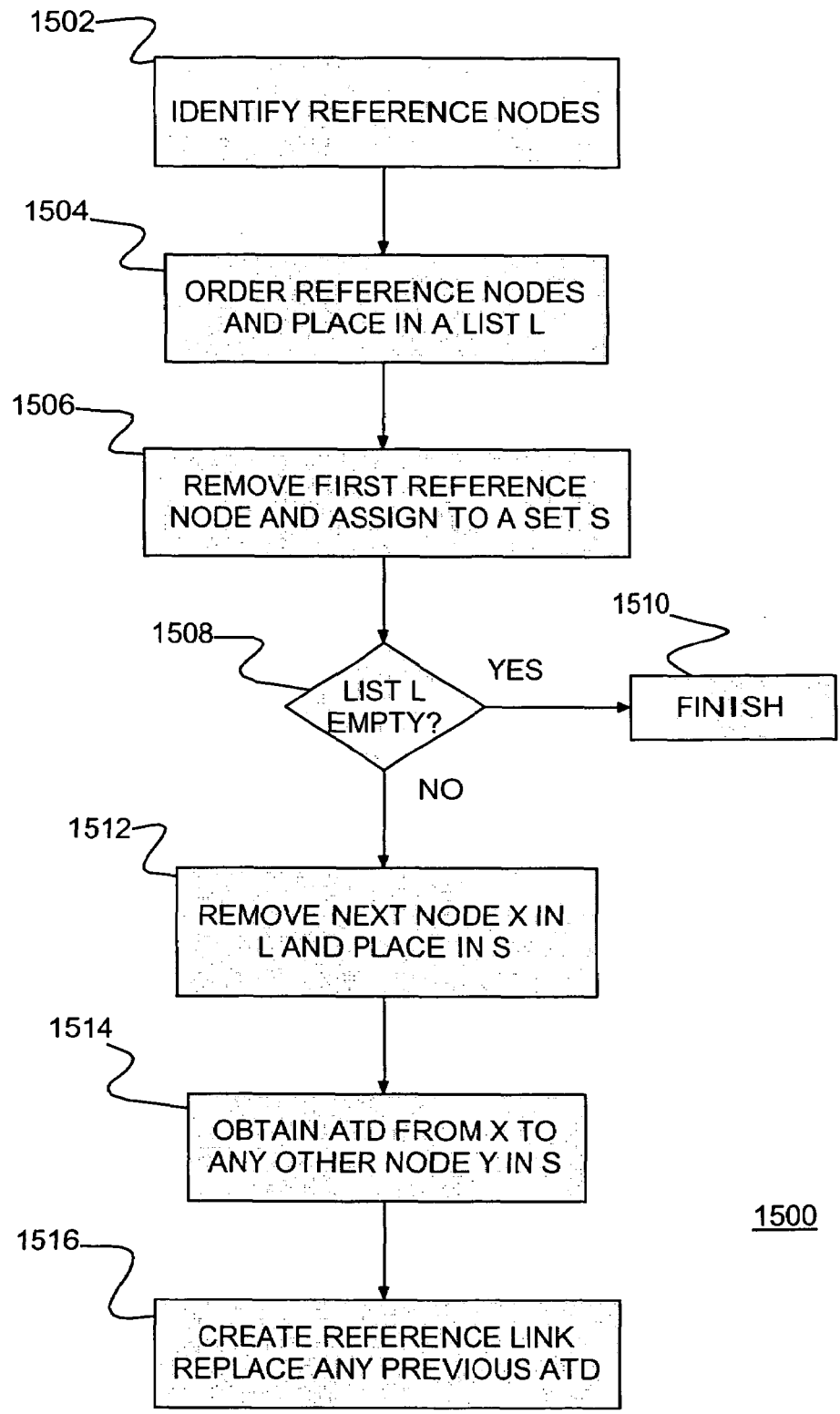
FIG. 7 shows a flowchart of an example of another method for reducing errors in the ATDs in the system of FIG. 1.

FIG. 7 shows an example of a flow diagram 1500 for obtaining timing associations in a general wireless network, e.g., network 150' in FIG. 6, wherein base stations are graphically represented as nodes and ATD values measured between pairs of base stations are graphically represented as links. Timing markers provide timing associations for multiple base stations, each termed a reference base station, and errors in timing associations from timing markers are negligible in comparison to errors in ATD values. In a first step 1502, each reference base station is designated as a reference node. In a second step 1504, the reference nodes are ordered and placed in a List L. Next, in a step 1506, the first listed reference node is removed from the list L and placed in an initially empty set S. In a step 1508, the list L is checked to determine whether any nodes remain. If the list L is empty, the procedure finishes in step 1510. Otherwise, in a step 1512, the next reference node X in the list L is removed and placed in the set S. On the initial iteration through this step 1512, the reference node X is the second reference node originally in list L. In step 1514, the ATD between the reference node X and any other reference node Y in set S (i.e., ATD between the first and second reference nodes in the initial iteration) is obtained from the difference between their respective transmission time references at the same common time instant. In step 1516, the newly generated ATD between nodes X and Y replaces any previous ATD between nodes X and Y and creates a reference link between nodes X and Y. Steps 1508, 1512, 1514 and 1516 are repeated for each reference node remaining in the ordered list L. For each repetition, one error free ATD value is added on a new reference link between each new reference node X and one of the preceding reference nodes Y in S. When the list L is empty in step 1508, the procedure ends in step 1510.

After the initial iteration, when ATDs are obtained in step 1514, existing links are checked in step 1516 to determine if there is already a link in the network between the same pair of reference nodes X and Y (representing the availability of an ATD obtained by the mobile units). If so, the new ATD value replaces the previous ATD value for this link and the error in the ATD is set to zero. If a link does not already exist between the two reference nodes then, the new link is included as an additional link with an ATD value whose error is taken as zero. This newly added or newly modified link between the two reference nodes with an error free ATD value is designated as a reference link. Then, returning to step 1508 the list L is checked for remaining reference nodes. As long as nodes remain in the list L, one (designated X) is removed from L on each iteration, placed in S in the step 1512 and an ATD is obtained from this current node (X) to any one of the nodes in S (designated Y) in step 1514. In the step 1516, a new reference link, associated with this ATD, is also created between the current node X and the node Y.

The transmission timing to common time associations for the reference base stations associated with each next node X and each node Y are essentially error free and independent of the timing associations for other reference base stations. So, one new independent and error free ATD value associated with a reference link can always be added for each new reference node X in the list L as defined for the step 1516. However, for any particular reference node X, a second independent error free ATD value associated with a second reference link cannot be added. This is because the reference links so far added interconnect the reference node X and all other reference nodes previously placed in the set S. Adding a second reference link with an associated second ATD value between the reference node X and any of the other already interconnected reference nodes in S inevitably creates a closed loop of reference links. The sum of the error free ATD values on the reference links in this closed loop must be zero, thereby enabling deriving the newly added second ATD value from previously added ATD values. Thus, addition of a second reference link for any reference node X removed from the ordered list L does not provide a new independent ATD value, but merely a value that can already be derived from previously obtained ATD values.

Thus, the number of reference links formed by the complete set of reference nodes is one less than the number of reference nodes. Each new reference link adds one new error free ATD value that improves accuracy, either by replacing an already existing estimated ATD value, thereby removing that ATD's estimation error; or by forming one new closed loop of reference and non-reference links, thereby providing one new equation for determining the error values. This reduces by the number of reference nodes less one the number of additional equations, based on assumptions or statistical information for ATD values, that are required to solve for all error values. With a sufficient number of reference nodes, no additional equations would be needed.

As described hereinabove with reference to FIG. 2, errors in the ATDs may first be reduced or eliminated using, for example, the graphical procedure described for step 144. Then, in step 146 an association between transmission timing and common time is obtained for each non-reference base station using the ATDs supplied from the mobile units and the timing associations for the reference base stations supplied by the timing markers. Typically, the central entity obtains these relationships, although they may be derived in one of the base stations or any other suitable location.

If there is only one reference base station, or if the central entity decides to use only one chosen reference base station, then the associations are derived somewhat differently. First, the transmission timing difference between the reference base station and each non-reference base station is calculated using the ATDs. Referring again to the example network represented by the graph 150 of FIG. 3, paths are identified along the links between pairs of nodes from the reference base station to each non-reference base station. The transmission timing differences, which are known for each link from the ATD for each link, are summed to determine the cumulative transmission timing difference along the sequence of links. For example, if base station 102 is selected as the reference, the timing difference to base station 112 can be obtained as $(T_{13}+T_{35}+T_{56})$, where the $T_{ij}$ values now represent error corrected ATDs following application of the error reduction, e.g., 1400 in FIG. 5. This produces consistent results. So, the same time difference may be obtained using any path, e.g., the path producing the sum $(T_{12}+T_{24}+T_{46})$. If a path cannot be found to some non-reference base station from the reference base station 102 because ATD values were not provided for certain pairs of base stations; then, the network must be partitioned into two or more interconnected subsets of nodes with a reference node (reference base station) located in each interconnected subset. Precise common timing may be calculated separately for each subset as if that subset was a complete network.

Having obtained a transmission timing difference between the chosen reference base station 102 and any other base station 104, 106, 108, 110, 112, a timing association for the other base station is obtained. So, in the step 146 the transmission timing difference is added to the transmission timing reference for the reference base station 102 to give the transmission timing reference for the other base station, e.g., 112. This derived transmission timing reference may now be associated with the common time reference for the reference base station 102, thereby providing the needed timing association for the other base station 112.

The examples 1400 and 1500 hereinabove described for the error reduction step 144 may require certain assumptions in order to obtain and eliminate the error values in the ATD values. Errors introduced by these assumptions would not be eliminated and would limit the accuracy of the error reduced ATD values. It is thus advantageous to have other examples of error reduction that do not depend on uncertain assumptions.

Figure 8:
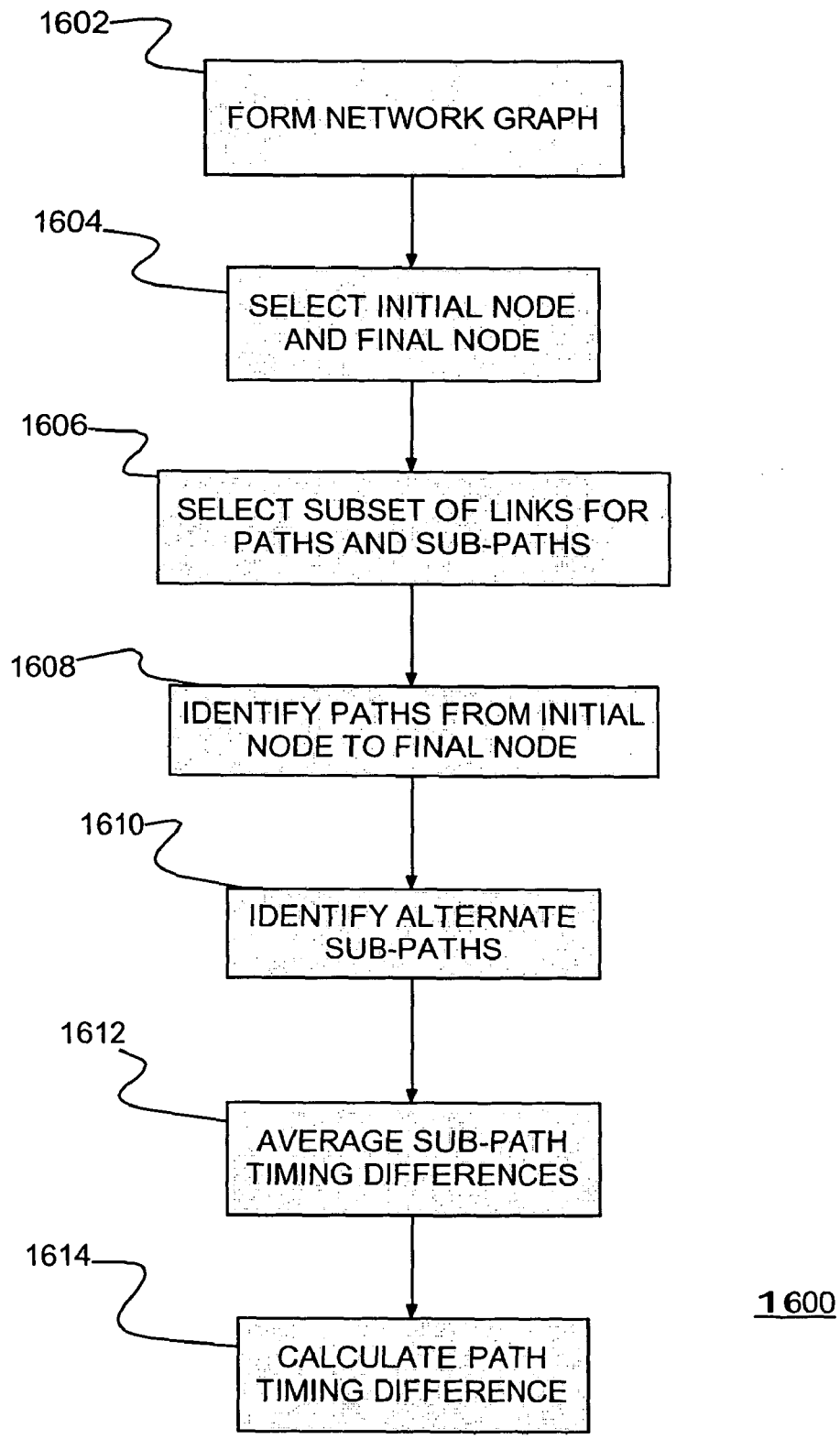
FIG. 8 shows a flowchart of an example of an alternate error reduction method that may be used to reduce independent time difference errors in the system of FIG. 1.

FIG. 8 shows a flow diagram of an alternate example 1600 for completing ATD error reduction step 144 of FIG. 2 in coincidence with timing difference association derivation step 146, instead of separately. This alternate approach 1600 is particularly suitable when the errors in the ATD values are independent of one another though it may be applied when the errors are interdependent. Also, the alternate approach 1600 of this example does not require additional assumptions to calculate errors in ATD values. First in step 1602 a conceptual network graph is formed of the nodes representing base stations and links between nodes representing ATD values between pairs of represented base stations. In step 1604, a particular initial node and a particular final node are chosen or identified. Preferably, the initial node is chosen to correspond to some reference base station and the final node is chosen to correspond to any base station for which a timing association is needed. In step 1606, a subset of links between the initial node and the final node is chosen. The subset may include all links in the network. Then, in step 1608 paths are selected from the subset leading from the initial node to the final node. Paths containing the fewest number of links from the subset are selected and with each link appearing in just one path.

During the succeeding steps as will be explained hereinbelow, transmission timing differences are obtained along alternative paths between the initial and final nodes and are averaged to yield a more accurate timing difference. The transmission timing difference along any path or sub-path is obtained as the sum of the ATD values for the links comprising that path or sub-path. ATDs are also expressed consistently such that in traversing from one end of a path or sub-path to the other in a direction leading towards the final node, the transmission timing of the base station represented by each preceding node is always subtracted from the transmission timing of the base station represented by the succeeding node. Once the ATD error reduction example of 1600 has been completed for particular initial and final nodes, the timing association for the base station corresponding to the final node is obtained by summing the transmission timing difference between the initial and final nodes with the transmission timing reference for the reference base station corresponding to the initial node. The transmission timing reference so obtained is then associated with the common time reference established in step 142 of the example 130.

Limiting each link to just one path in the example 1600 prevents accumulation (correlation) of the same ATD error for any link that might otherwise occur if the link was used in several paths when the timing differences for these paths are averaged. Provided each link is used only once, independent positive and negative errors cancel and tend to reduce the error in the final averaged timing difference. The error variance (i.e. variance of the error) in the averaged timing differences gradually reduces because of independence between the errors in the timing differences being averaged. When ATDs have independent error components with zero expectation and known variance, the error variance in each timing difference being averaged can be calculated in advance. In this case, using a weighted average of the timing differences with the weight assigned to each timing difference being inversely proportional to the variance of its error minimizes the error variance in the resulting weighed average by a well known principles of statistics. This minimal error variance equals the reciprocal of the sum of the reciprocals of the separate error variances. Further, using as many paths as possible in step 1608 enables greatest reduction in timing difference error (due to averaging more independent values), while using shortest paths ensures minimum timing difference error on any one path.

Once all paths have been obtained, in step 1610 alternative sub-paths that use previously untried links from the subset are found for portions of each path. Then, in step 1612 the transmission timing differences over the alternative sub-paths are averaged to determine the timing difference over every portion of a path. Portions of any sub-path can be likewise obtained using alternative sub-paths provided the links being used were not already assigned to some other path or sub-path. Next in step 1614 the transmission timing difference for the whole path is calculated to provide the sought after transmission timing difference between the initial and final nodes. For a fixed wireless network topology, the precise choice of paths and sub-paths may be determined and optimized in advance to reduce the amount of calculation needed in the central entity.

Figure 9:
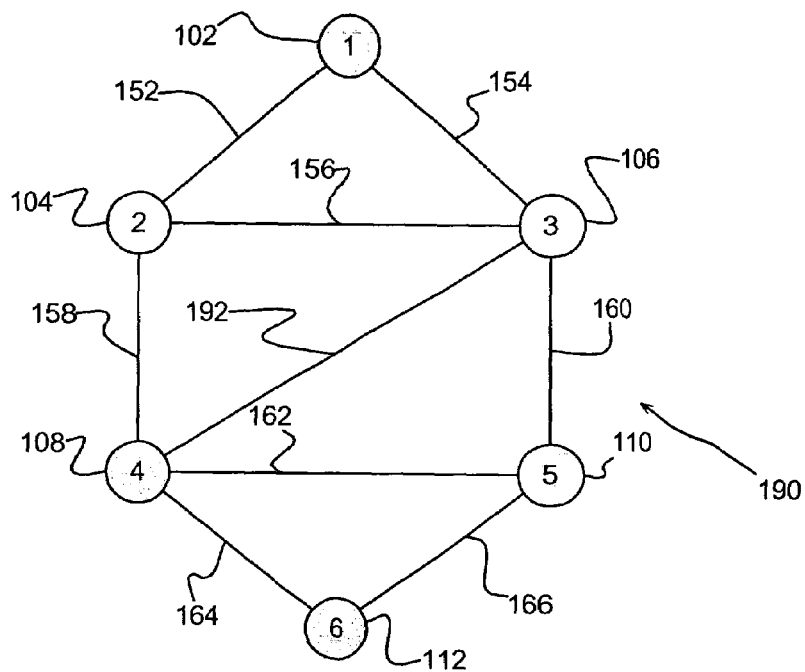
FIG. 9 shows an example conceptual graph generated for the method of FIG. 8 from the wireless network of FIG. 1.

FIG. 9 shows an example of a conceptual graph 190 generated in step 1602 of FIG. 8 from the wireless network 100 of FIG. 1, substantially similar to the graph 150 of FIG. 3 with like elements labeled identically. In this example, an additional link 192 is included between base stations 106 and 108. So, in step 1604 an initial node (e.g., node 1 corresponding to base station 102) and a final node (e.g. node 4 corresponding to base station 108) are selected arbitrarily. In the step 1606, all links in the network are selected for use in paths and sub-paths. Then in the steps 1608 and 1610, paths and sub-paths are identified between the initial and final nodes. Next in step 1612, an average timing difference value is calculated between the initial node and the final node by obtaining the timing differences from the initial node for as many paths as possible to the final node, giving preference to the shortest possible paths and such that each link only appears in one path. Node 4, for example, can be reached on paths with two or more links from node 1. The two shortest path alternatives involve just two links:

Path 1: node 1→node 2→node 4
Path 2: node 1→node 3→node 4.

The ensuing transmission time difference with node 4 may be obtained by summing the timing differences between the pairs of nodes along each path above. Errors in the absolute timing difference values between nodes are assumed to be independent random variables with a mean of zero (due to positive and negative errors canceling one another). Although it is not required that the errors be independent and random, this facilitates and improves timing measurement accuracy. Optionally, for greatest simplicity, each of the errors may be assumed to have the same variance. If, for example, the base stations provide statistical information to the central network entity 120 regarding the errors in the ATD values (e.g., the number and the standard deviation of measurements from which an ATD was derived), it may be possible to determine either the actual variance in the ATD error for any link or the variance relative to that for any other link. In this case, ATD value errors need not be assumed to share a common variance and, instead, enable more accurate transmission timing references because the weighted averaging employed can be based or more accurate variance values. Assuming for simplicity, a common variance in the example network of FIG. 9:

$$\begin{aligned}
\text{Let } V &= \text{error variance (i.e. variance of the error) in} \\
&\quad \text{any } ATD \text{ measurement} \\
&= VAR(e_{ij}) \text{ (for any two distinct nodes } i \text{ and } j \\
&\quad \text{connected by a link)}
\end{aligned} \quad (20)$$

$$\begin{aligned}
&= VAR \ (T_j - T_i - T_{ij}) \\
&= VAR \ (T_j - T_i) + VAR \ (T_{ij}) \\
&= VAR \ (T_{ij}) \\
&= \text{variance of the measurement of any } ATD, \\
&\quad \text{where it is assumed that the true value of any } ATD \\
&\quad (T_j - T_i) \text{ is fixed while being measured and} \\
&\quad \text{thus variation or variance is only due to error}
\end{aligned} \quad (21)$$

It should be noted that for any particular ATD measurement, the error variance is the same as the measurement variance because the measurement includes a fixed value (the true ATD at the time the measurement is made) plus the random error.

$$\begin{aligned}
\text{Let } T(N1, N2, N3 \ldots Nm) &= \text{cumulative timing difference on a} \\
&\quad \text{path from node } N1 \text{ to } N2 \text{ to} \\
&\quad N3 \ldots \text{to } Nm \\
&= (T_{N1N2} + T_{N2N3} + T_{N3N4} + \ldots + \\
&\quad T_{Nm-1Nm})
\end{aligned} \quad (22)$$

$$\text{then timing difference for Path } 1 = T(1, 2, 4) \quad (23)$$
$$= T_{12} + T_{24} \text{ (variance} = 2 \ V)$$

$$\text{timing difference for Path } 2 = T(1, 3, 4) \quad (24)$$
$$= T_{13} + T_{34} \text{ (variance} = 2 \ V)$$

Equations (23) and (24) include in parentheses the variance for the calculated timing difference (and thus the variance in the error in the calculated timing difference) for each path. This calculated timing difference variance is simply twice the variance V for the timing difference on any one link due to assuming independent errors. The two timing differences calculated using either path, in general, are not equal due to different errors, but can be averaged to yield a single statistically more accurate result as follows.

$$\begin{aligned}\text{mean timing difference on paths 1 and 2} &= [(\text{timing difference for path 1}) + \\ &\quad (\text{timing difference for path 2})]/2 \\ &= (T_{12} + T_{24} + T_{13} + T_{34})/2 \\ &\quad (\text{variance} = V)\end{aligned} \quad (25)$$

The variance of the mean timing difference (and thus the error variance for the mean timing difference) has been reduced to V, according to well known statistical results. Thus, the mean timing difference in equation (25) is more accurate than that obtained using either single path alone in equations (23) and (24). This more accurate timing difference can be improved, slightly, by replacing the hop from node 3 to node 4 for path 2 by two sequential hops from node 3 to node 5 and node 5 to node 4. The transmission timing difference and variance of the transmission timing difference across these alternative paths are:

$$T(3, 4) = T_{34}(\text{variance}=V) \quad (26)$$

$$T(3, 5, 4) = T_{35} + T_{54}(\text{variance}=2V) \quad (27)$$

The two timing differences from equations (26) and (27) can be averaged to yield a more accurate timing difference between nodes 106 and 108. However, because the two timing differences above have a different variance, a weighted average must be employed to minimize the final variance. Preferably, the weighting is based on a well known principles of statistics in which the variance of the weighted average of a set of independent random variables is minimized by assigning a weight to each random variable that is inversely proportional to its variance. The timing difference then given as follows.

$$\begin{aligned}\text{Let } T_{34}^* &= \text{averaged timing difference from node 3 to node 4} \\ &= 2/3[T_{34} + (T_{35} + T_{54})/2] \text{ (variance} = 2/3\ V)\end{aligned} \quad (28)$$

The more accurate timing difference, $T_{34}*$, in equation (28) with a variance of only 2V/3 can now be substituted for the timing difference $T_{34}$ in equation (24). This leads to an improved timing difference for Path 2 as follows:

$$\begin{aligned}\text{improved timing difference for Path 2} &= T(1, 3, 4)^* \\ &= T_{13} + T_{34}^* \\ &\quad (\text{variance} = 5/3\ V)\end{aligned} \quad (29)$$

This improved timing difference, T(1, 3, 4)*, for path 2 can now be combined with the timing difference T(1, 2, 4) for path 1 to yield a timing difference from node 1 to node 4 with a lower variance than before. Using a weighted average to minimize the variance, this is:

$$\begin{aligned}&\text{improved timing difference on paths 1 and 2} = 10/11 \\ &[T(1, 2, 4)/2 + 3/5 T(1, 3, 4)^*]\ (\text{variance}=10/11\ V)\end{aligned} \quad (30)$$

This timing difference variance of equation (30) is slightly less than that obtained in equation (25). Further, even though no timing difference was measured directly between the initial node 1 and final node 4, the resulting calculated timing difference in equation (30) is slightly more accurate than the result from any directly measured timing differences between pairs of nodes. An additional very small improvement in the timing difference from node 1 to node 4 can be obtained by replacing the hop from node 5 to 4 (for the alternate path from node 3 to 4 going via node 5) with hops from node 5 to 6 and node 6 to 4. Obtaining the timing difference from node 5 to 4 as a weighted average of the timing differences on these alternative paths can reduce the timing difference variance for this part of the path and lead to similar (though smaller) reductions in the path timing difference variance when gradually worked back into the timing difference from node 1 to node 4.

If the error variance in the ATD measurement for each link is not assumed to be the same, but is instead obtained from statistical information provided along with ATD measurements by the base stations; then, the alternate example 1600 of FIG. 8 may be applied with modification for coincident ATD error reduction and derivation of timing associations. After identifying sub-paths in step 1610, the mean transmission timing difference along any sequence of links forming a path or sub-path from the initial node to the final node is obtained as the sum of the individual measured ATD values for the constituent links. The error variance in this transmission timing difference is obtained as the sum of the variance values for the errors in the measured ATDs. When averaging the transmission timing differences between two nodes along two or more alternate paths between these nodes in step 1612, the error variance in the resulting average transmission timing difference is minimized by:

Let $p$=number of paths ($p \geq 2$)

$TD_i$=transmission timing difference for path $i$ ($1 \leq i \leq p$)

$VAR_i$=error variance in $TD_i$ $\underline{TD}$=average transmission timing difference for all p paths $\underline{VAR}$=error variance in $\underline{TD}$ then $\underline{TD} = \underline{VAR} * \Sigma(i=1 \text{ to } n) TD_i / VAR_i$ \quad (31)

$\underline{VAR} = 1/\Sigma(i=1 \text{ to } n) 1/VAR_i$ \quad (32)

Equations (31) and (32) minimize the variance, $\underline{VAR}$, in the resulting average transmission timing difference $\underline{TD}$; provided the transmission timing differences, $TD_i$, along each of the p paths are independent of one another. The result follows from the fact that the error variance in any transmission timing difference, $TD_i$, is the same as the variance of the transmission timing difference because it includes a fixed part (the true value of $TD_i$) with zero variance and an error component with the variance $VAR_i$. With this equivalence, equations (31) and (32) follow from well known principles of statistics. After determining weighted averages in step 1612 by combining the transmission timing differences along different paths and sub-paths, a final path transmission timing difference is calculated in step 1614.

The example 1600 of FIG. 8 uses only one initial node, representing one reference base station, to obtain the timing association for any other final node. If timing associations are provided for multiple reference base stations by, for example, more than one timing marker, then more reliable and more accurate timing differences may be achieved. First, ATDs may be obtained directly between pairs of reference nodes (i.e. reference base stations) as described previously in connection with the graphical example 1500 of FIG. 6. For each pair of reference nodes, a reference link joining the reference nodes can be added to the network graph (or used to replace an existing non-reference link) with a nearly error free ATD attached to the reference link, much less than the error for other links associated with ATDs obtained from mobile units. Including the reference links in preference to non-reference links in any path from an initial node to another node (e.g. final node) reduces the error in the computed time difference. For the graphical example of the network 150' in FIG. 6, if the single chosen initial node is node 1 corresponding to base station 102, then a path to node 6 (base station 112) may use the reference link 174 from node 1 to node 4 and the non-reference link 164 from node 4 (108) to node 6 rather than the sequence of three non-reference links 152 from node 1 to 2, 158 from node 2 to 4 and 164 from node 4 to 6. The computed time difference on each of the 2 paths is:

$$T(1, 2, 4, 6) = T_{12} + T_{24} + T_{46} \text{ (variance=3}V\text{)} \quad (33)$$

$$T(1, 4, 6) = T_{14} + T_{46} \text{ (variance=}V\text{)} \quad (34)$$

If the timing difference $T_{14}$ on the reference link 174 between nodes 1 and 4 has negligible error (zero variance), then the second path represented in equation (34) provides an error with only one third of the variance provided by the first path represented in equation (34). The improvements described hereinabove to reduce error further by finding additional paths and sub-paths may then also be applied with preference given to using paths involving the fewest number of non-reference links.

Figure 10:
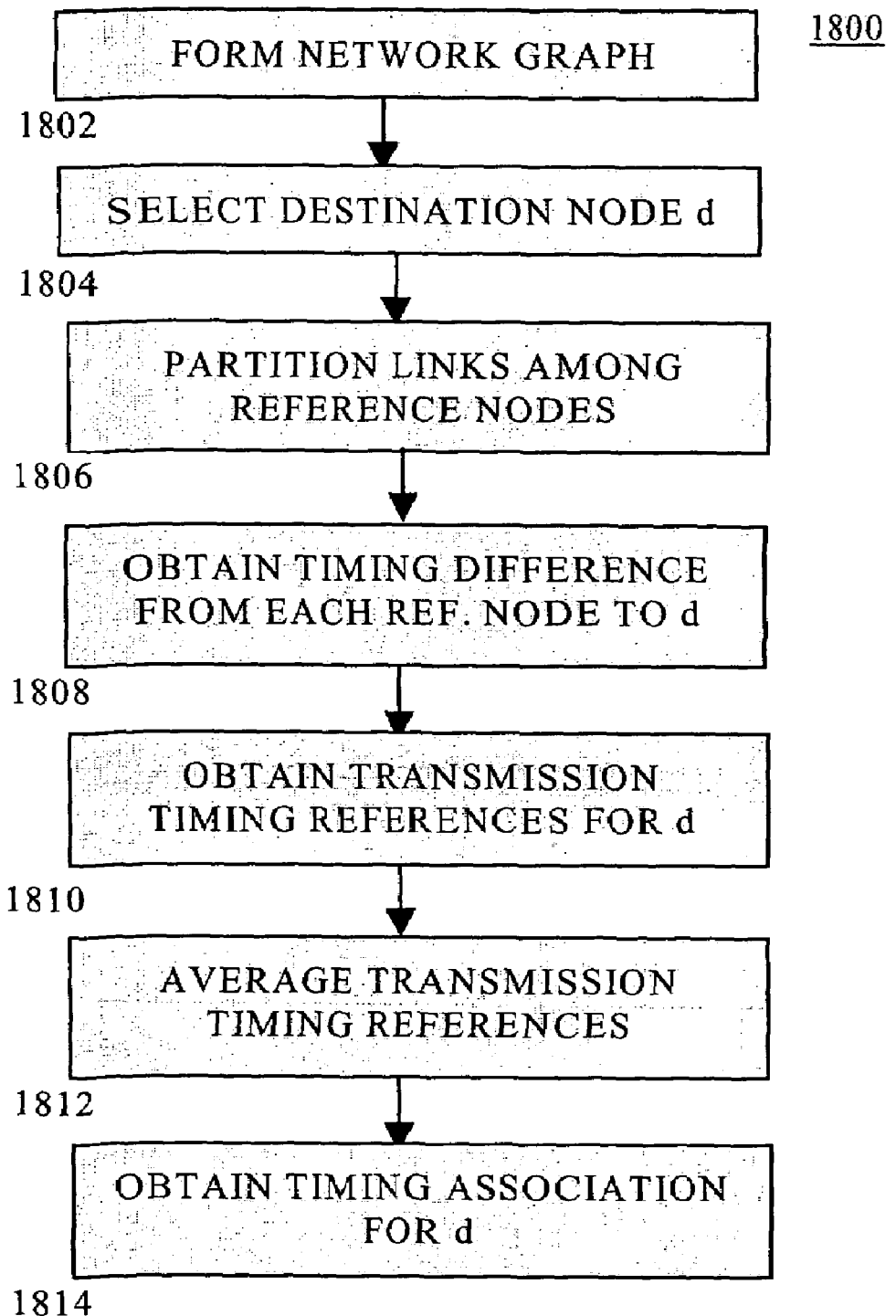
FIG. 10 shows a flowchart of an example of another method of obtaining a timing association for base stations in the system of FIG. 1.

FIG. 10 shows a first example of a flow diagram 1800 for the steps 144 and 146 of FIG. 2 of reducing errors in ATDs and, in coincidence, determining timing associations for a network with multiple reference nodes. In this example 1800, a separate time association for any non-reference node is obtained from the time association for each of multiple reference nodes; and, then, the resulting time associations are averaged using weighted averaging. First step 1802, a graphical representation of the wireless network is obtained as described hereinabove with nodes representing base stations, reference nodes representing reference base stations and links between nodes representing available ATD measurements between pairs of base stations. However, reference links described hereinabove between pairs of reference nodes are not needed. Next, in a step 1804, a non-reference node is chosen for which a timing association is derived. The selected non-reference node is referred to herein as the "destination node" and further designated with "d" within the context of discussion herein. Next in a step 1806, the links in the graphical network are partitioned into separate subsets, specific to the particular destination node, with one subset assigned to each reference node. In a step 1808, a transmission timing difference with reduced error is computed with reference to the example 1600 of FIG. 8 for each reference node with its particular subset of links between this reference node and the destination node. In a step 1810, the transmission timing difference between the destination node and the reference node is added to the transmission timing reference for the reference node to yield a distinct transmission timing reference for the destination node relative to that reference node. In the step 1812, transmission timing references are averaged with a weighted average with the weight for each transmission timing reference inversely proportional to the variance of its error to minimize the resulting error variance. In step 1814 a timing association is obtained for the destination node as described in further detail hereinbelow.

So, in step 1808, a reference node is assigned as the initial node and the destination node as the final node (step 1604 of example 1600) and the subset of links selected (step 1606 of example 1600) is defined to be the subset of links assigned to the reference node. ATD values are then summed and averaged on the various paths and sub-paths between the initial node (reference node) and final node (destination node) according to steps 1608, 1610, 1612 and 1614 of the example 1600. For this example, paths and sub-paths are restricted to using only the particular subset of links assigned to that reference node. If the error in the ATD for each link is independent of the errors in the ATDs for all other links and has a variance that can be calculated or assumed (e.g. a variance V assumed to be the same as that for the ATD errors for other links), then the variance for the error in the resulting timing difference between the reference node and the destination node can be obtained as described hereinabove (e.g., as some multiple or fraction of a common V).

Then, in step 1810, the transmission timing reference obtained in this step is associated with the same common timing reference used for all reference nodes (e.g., step 142 in FIG. 2). Consequently, each reference node leads to a distinct transmission timing reference for the destination node relative to each distinct reference node but associated with the same common time reference. Because of the higher precision of the timing associations obtained for all reference nodes, differences in the transmission timing references obtained for the destination node are due only to errors in the timing differences calculated between each reference node and the destination node from the link ATD values.

In step 1812 to minimize error variance, a weighted average is taken of the resulting transmission timing references, as previously described. Preferably, the weight for each transmission timing reference is taken inversely proportional to the variance of its error, analogous to the above description for equations (31) and (32). In particular, because a different set of links is used to obtain each transmission timing reference for the destination node relative to each reference node, errors in the transmission timing references are independent of one another (provided errors in the link ATDs are independent of one another) enabling averaging, to yield a more accurate timing reference, as further shown in the example of FIG. 11.

Figure 11:
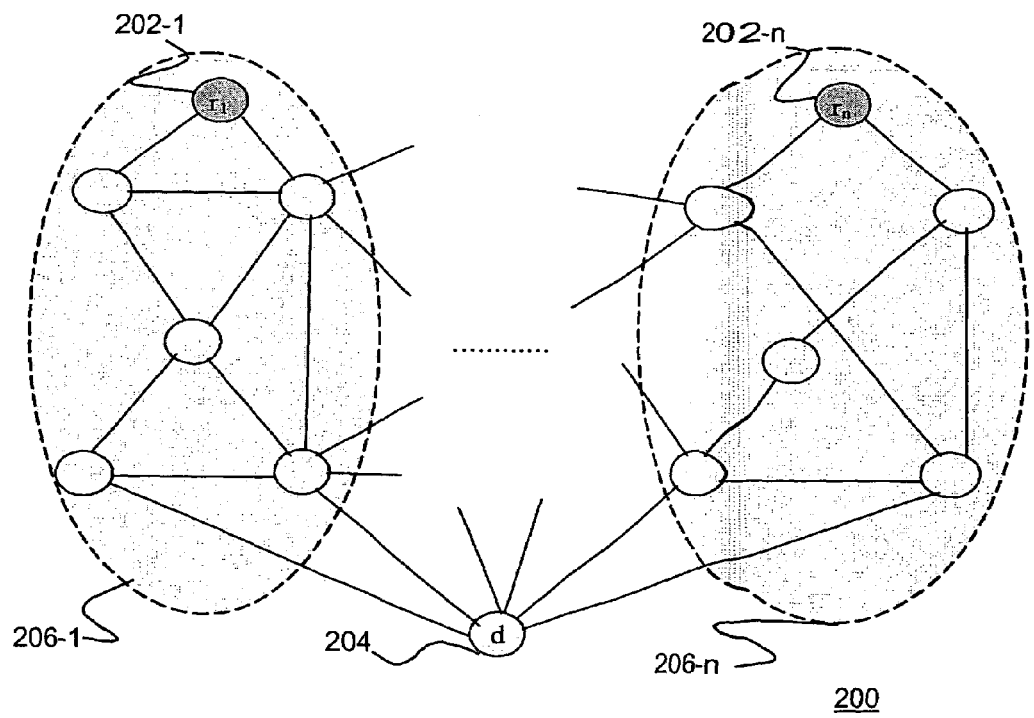
FIG. 11 shows an example of a conceptual graph generated for the method of FIG. 10 from the wireless network of FIG. 1.

So, in the example of FIG. 11, a graphical network representation 200 includes n references nodes 202-1, . . . 202-n, identified as $r_1, r_2 \ldots r_n$, a single destination node 204, identified as d, and n non-overlapping subsets of links 206-1, . . . 206-n, each associated with a distinct reference node 202-1, . . . 202-n. Each subset 206-1, . . . 206-n contains paths and sub-paths from the respective reference node 202-1, . . . 202-n to the destination node 204. Although each link is assigned to one subset 206-1, . . . 206-n associated with one reference node 202-1, . . . 202-n, not all links can necessarily be used in a path from their associated reference node 202-1, . . . 202-n to the destination node 204 because to do so may require using links in subsets belonging to other reference nodes. So, transmission timing differences for each reference node are calculated for error reduction as described hereinabove and a final calculated transmission timing difference is obtained for each particular subset 206-1, . . . 206-$n$ to yield the following timing differences and error variance values between each reference node and the destination node 204.

Let $T_{id}$ = calculated timing difference between reference node $r_i$ and destination node $d$ ($1 \leq i \leq n$)

$V_i$ = error variance in $T_{id}$

= variance of $T_{id}$ $C$ = common time reference for all $n$ reference nodes $T_i^*$ = transmission timing reference for reference node $r_i$ associated with common time reference $C$ The transmission timing reference for the destination node 204 from each of the reference nodes 202-1, . . . 202-$n$ is then:

$T_i^d$ = transmission timing reference for node $d$ obtained (35)

from reference node $r_i$ ($1 \leq i \leq n$)

= $T_i^* + T_{id}$ (variance of error = $V_i$)

Provided the transmission timing references, $T_1^*$, $T_2^*$, ... $T_n^*$, for the reference nodes are measured precisely using measurements from the timing markers; the error variance for each transmission timing reference $T_i^d$ for the destination node 204 derived from the timing reference $T_i^*$ for any reference node $r_i$ is the same as the variance $V_i$ for the error in the timing difference $T_{id}$ between the reference node $r_i$ and destination node 204. The resulting transmission timing references can then be averaged as follows:

$T^d$ = weighted average of $T_1^d, T_2^d, ...T_m^d$ (36)

= $\sum (\text{sum } i = 1 \text{ to } n)T_i^d / V_i] / [\sum (\text{sum } i = 1 \text{ to } n)1 / V_i]$ = $T_1^d + [\sum (i = 2 \text{ to } n)(T_i^d - T_1^d) / V_i][\sum (i = 1 \text{ to } n)1 / V_i]$ (37)

$V^d$ = variance of $T^d$ (38)

= error variance in $T^d$

= $1 / [\sum (\text{sum } i = 1 \text{ to } n)1 / V_i]$

In equation (36), the transmission timing references calculated for the destination node 204 are averaged directly. In the equivalent equation (37), the differences between transmission timing references relative to reference node $r_1$ are averaged, which may more convenient since the differences may tend to be much smaller than the transmission timing references themselves. If some of the transmission timing references have wrapped around the maximum transmission timing unit (e.g. hyperframe in GSM) whereas others have not; it is necessary to express those timing references that have not quite wrapped around as negative timing references relative to the start of transmission timing (e.g. relative to GSM frame zero, timeslot zero and bit zero in GSM) in order to avoid errors. Equations (36) and (37) each produce a transmission timing reference $T^d$ for the destination node $d$ that is associated with the common time reference $C$. Thus, the timing association for the destination node 204 is obtained, e.g., in the step 1814. The variance $V^d$ of this transmission timing reference is minimized and is given in equation (38). Since the variance of $T^d$ equals its error variance, the error in the resulting timing association is minimized.

In the event that any transmission timing reference, e.g., $T_i^*$ for reference node $r_i$, is measured incorrectly by a timing marker (i.e., contains some significant error), there is a noticeable difference between the transmission timing reference, $T_i^d$, derived for the destination node 204 from this and the other transmission timing references derived for d from other reference nodes in equations (36) and (37). Omission of this erroneous or incorrect transmission timing reference in these equations avoids introducing a significant error factor into the resulting average value for the transmission timing reference for d. In particular, the availability of transmission timing references for d derived independently from different reference nodes 202-1, . . . 200-$n$ enables reference nodes with significant timing errors to be easily detected.

Figure 12:
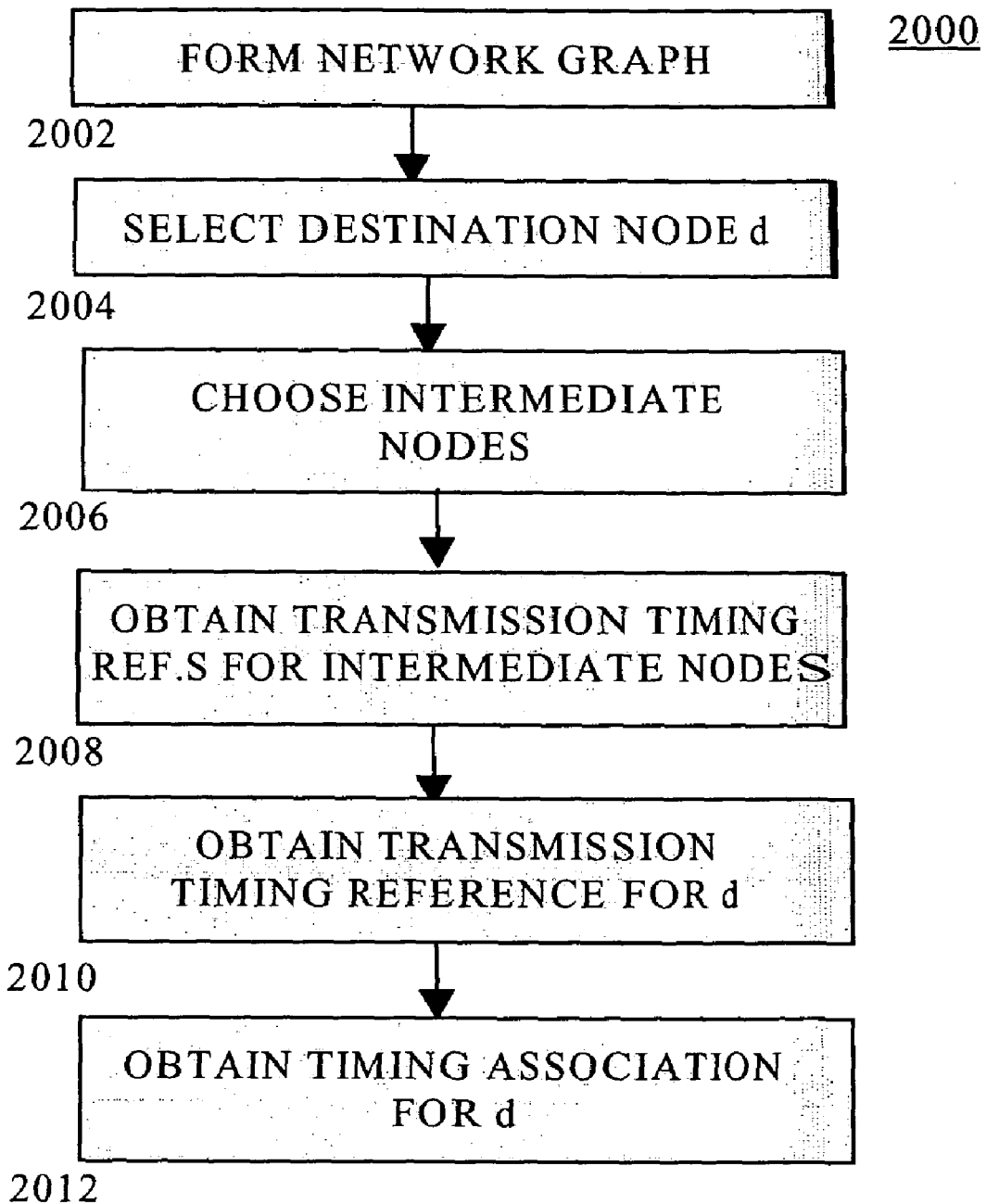
FIG. 12 shows a flowchart of an example of another method of obtaining a timing association for a base station in the system of FIG. 1.

FIG. 12 shows a flow diagram of a more flexible approach 2000 for reducing errors in step 144 and, in coincidence, obtaining timing references from multiple reference nodes in step 146 using paths from any reference node to a destination node including links assigned to other reference nodes. As described hereinabove, the error in computed timing differences decreases with the number of paths and subpaths included in obtaining the timing differences. First, in step 2002, a network graph is formed with nodes connected by links to reference nodes. Next in a step 2004, a destination node (d) is chosen for timing association. Then, in a step 2006, non-reference nodes, referred to hereinafter as "intermediate nodes", are chosen to the selected destination node d. Then, in a step 2008 for each of the intermediate nodes transmission timing references are obtained from the transmission timing references for the reference nodes. Then, in a step 2010, the transmission timing reference for the destination node d is obtained from the transmission timing references for the intermediate nodes and reference nodes. The transmission timing reference for any intermediate node in the step 2008 and, eventually, the transmission timing reference for the destination node d in the step 2010 are obtained from the transmission timing references for other ones of the reference nodes and/or intermediate nodes. If a transmission timing reference for an intermediate node needs to be obtained in part from the transmission timing reference of another intermediate node, then the latter's transmission timing reference is first obtained from the transmission timing references for other nodes—e.g., references nodes.

Figure 13:
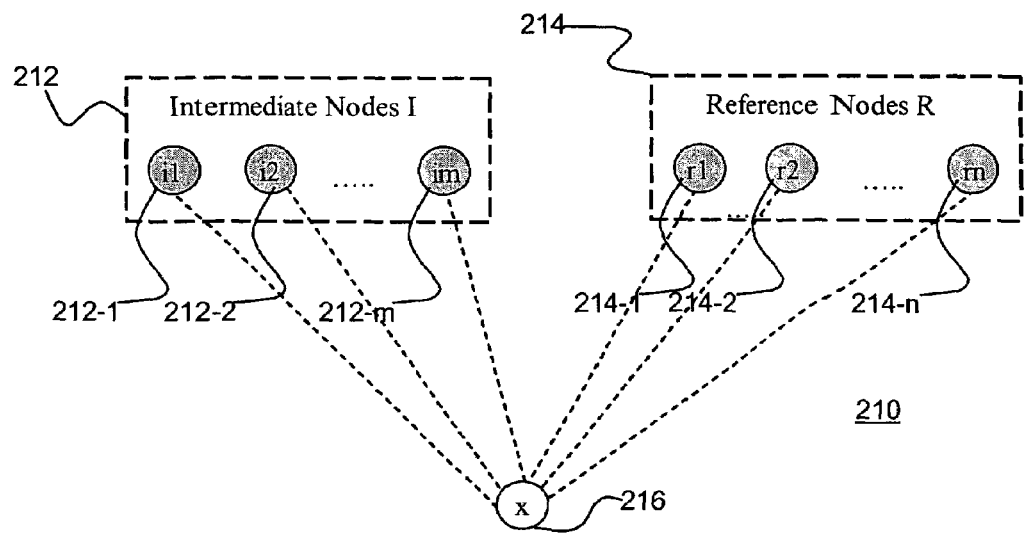
FIG. 13 shows an example of a conceptual graph generated for the method of FIG. 12 from the wireless network of FIG. 1.

FIG. 13 shows an example or representation of a network 210 as a set (I) 212 of intermediate nodes 212-1, 212-2, . . . 212-$m$, identified as $i_1, i_2, \ldots i_m$ ($m \geq 0$), a set (R) 214 of reference nodes 214-1, 212-4, . . . 214-$n$, identified as $r_1, r_2, \ldots r_n$ ($n \geq 0$) and node 216 identified as node x, which may be either an intermediate node or the destination node. The transmission timing reference may be determined in step 2008 or 2010 for node x (216) from the transmission timing references for each node (y) of the set I (212) and set R (214), similarly, as described hereinabove for the example 1800, to determining the transmission timing reference of the destination node from the transmission timing references for multiple reference nodes. A subset of links is first assigned to each node 212-1, 212-2, . . . 212-$m$ in the set I (212) and to each node 214-1, 214-2, . . . 214-$n$ in the set R (214). Each assigned subset of links must not overlap with the other subsets or with any other subset of links assigned to determine the timing reference of any other node. Thus, once any link is assigned, it cannot be assigned again.

Referring again to the combined example 1600 of FIG. 8, a transmission timing difference may be obtained between each node y in 212-1, 212-2, . . . 212-*m* and 214-1, 214-2, . . . 214-*n* in the sets I (212) and R (214) and the node x (216). The transmission timing references for the reference nodes 214-1, 214-2, . . . 214-*n* have already been determined in steps 140 and 142 of the example 130 from the timing markers as have been transmission timing references for the intermediate nodes 212-1, 212-2, . . . 212-*m* due to previous applications of the method of this example. Thus, the transmission timing reference for each node y in 212-1, 212-2, . . . 212-*m* and 214-1, 214-2, . . . 214-*n* in the sets I (212) and R (214) is already known. In step 1604 of the example 1600, the initial and final nodes are set to the nodes y and x, respectively. In steps 1606-1610 the subset of links assigned to the node y and paths from y to x using these links are identified, and in steps 1612 and 1614, the transmission timing difference between nodes y and x is obtained. In steps 1612 and 1614 the error variance in the transmission timing difference between nodes y and x is also obtained from the ATD error variance values for all links, assuming that measured ATDs are independent of one another. These ATD error variance values may be calculated from ATD statistics provided by base stations or assumed to be equal. A transmission timing reference for the node x is then obtained by adding the transmission timing difference between nodes x and y to the transmission timing reference previously obtained for the node y. The error variance in this transmission timing reference is likewise obtained as the sum of the error variances for these two timing values. Finally, the transmission timing references for the node x, obtained from each node y in the sets I and R, is averaged to yield a more accurate transmission timing reference using a weighted average such as described hereinabove with reference to step 1812 of FIG. 10 with a weight assigned to each transmission timing reference being inversely proportional to its error variance.

As noted hereinabove, each link assigned to any node y in the sets I (212) and R (214) is not assigned to any other node. Also for this example, the errors in the ATDs on the individual links are independent of one another. Therefore, the transmission timing difference errors obtained from each node y and, as a result, transmission timing reference errors for node x obtained from each node y are independent of one another, provided transmission timing references for each node y are independent of one another. The latter condition is satisfied for the first intermediate nodes for which transmission timing references are obtained only from reference nodes y and, will thus apply by induction to later intermediate nodes for which transmission timing references are obtained from previous intermediate nodes. Thus, the resulting timing reference for node x obtained via a weighted average has improved accuracy. In addition, for any of the (y) nodes in the sets I (212) and R (214) with a significantly erroneous transmission timing reference, the transmission timing reference derived for the node x differs significantly from the other derived transmission timing references for x. Accordingly, the transmission timing reference in error is easily detected and excluded from the averaging process.

Figure 14:
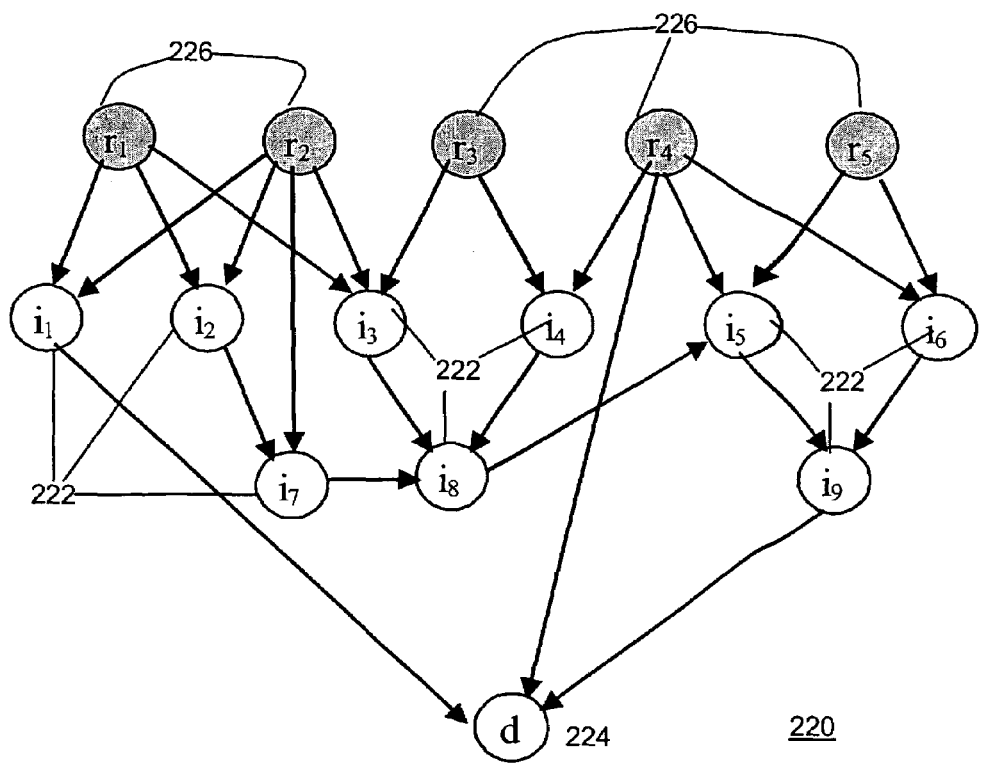
FIG. 14 shows an example of a conceptual graph generated for the method of FIG. 12 from the wireless network of FIG. 1.

FIG. 14 shows a graphical example of a network 220 and referring again to the example of 2000 of using intermediate nodes 222 to reduce errors in step 144 and obtain timing associations in step 146. Arrows indicate from which nodes (at the tail of any arrow) transmission timing references are taken to obtain the transmission timing reference of another node (at the head of the arrow). A transmission timing reference is determined for the destination node 224 from the reference nodes 226 via the intermediate nodes 222. In particular, step 2008 is applied first to each of the intermediate nodes 222 and then step 2010 is applied to the destination node d 224 guided by:

1) The transmission timing reference for any reference node 226 may contribute to the determination of the transmission timing references for one or more intermediate nodes 222 and/or the destination node 224. For example, the transmission timing reference for reference node $r_4$ contributes to the determination of the transmission timing references for intermediate nodes $i_4$, $i_5$ and $i_6$ as well as the destination node 224. Since the transmission timing references for the reference nodes 226 normally are very accurate (i.e. effectively have a zero error), using the same reference node's transmission timing reference to help determine the transmission timing reference for multiple intermediate nodes (and/or the destination node) does not introduce correlated errors.

2) The transmission timing reference for an intermediate node 222 may only contribute to the determination of the transmission timing reference for one other node—either another intermediate node 222 or the destination node 224. So, for example, the transmission timing reference for each of intermediate nodes $i_1$, $i_2$ . . . $i_9$ contributes to the determination of the transmission timing reference for only one other node—either another intermediate node 222 or the destination node 224. Since the transmission timing reference determined for any intermediate node 222 contains an error (dependent on the errors in the ATDs for all the links associated with the nodes whose transmission timing references were used to obtain that node's transmission timing reference). Error in any transmission timing reference used to obtain the transmission timing reference of more than one other node contributes to the error in more than one value for the transmission timing reference of the destination node 224 or, at least for some intermediate node. Averaging the values for these transmission timing references may then not improve accuracy because some of the values being averaged contain correlated errors (i.e. errors that are not independent).

3) In any sequence s of intermediate nodes $i_{s1}$, $i_{s2}$, $i_{s3}$ . . . , where each node $i_{sj}$ (222) in the sequence contributes to the determination of the transmission time reference for the succeeding node $i_{sj+1}$, the sequence should terminate at the destination node 224. So, in following through any sequence of arrows, representing the progressive determination of transmission timing references for intermediate nodes (e.g. $r_4 \rightarrow i_4 \rightarrow i_8 \rightarrow i_5 \rightarrow i_9 \rightarrow d$), the sequence always ends at the destination node 224. Thus, loops are avoided in which the transmission timing for an intermediate node 222 may end up, through a sequence of intermediate nodes 222, in contributing to its own value.

Figure 15:
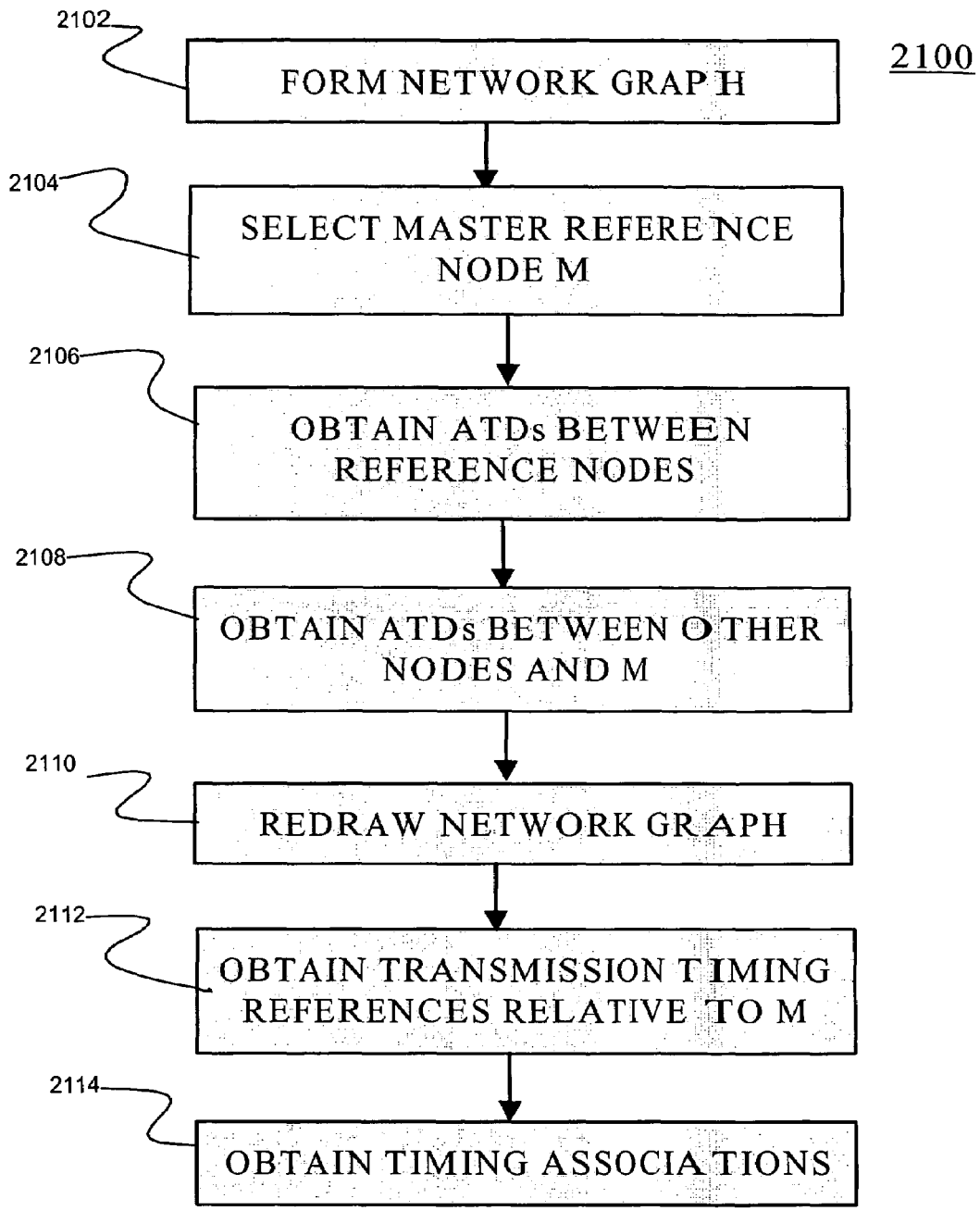
FIG. 15 shows a flowchart of an example of another method of obtaining a timing association for a base station in the system of FIG. 1.

FIG. 15 shows a flow diagram 2100 for deriving a transmission timing reference for a destination node from multiple reference nodes, much simpler than described in FIGS. 10 and 12. Further, although this example 2100 has some similarity to the example of FIG. 7, it is also much simpler. In particular, this simpler example 2100 has application when the transmission timing associations for all reference nodes are very precise and reliable in the sense that any errors are much smaller than the link ATD value errors. All reference nodes are replaced by a single "master reference node" and any non-reference node with a link to at least one reference node is assigned a single link to the master reference node.

First in step 2102, a network graph is formed of nodes, links and a number of reference nodes. Then in a step 2104, one node is selected as a master reference node M. Preferably, M has a timing association that is very accurate and reliable. Next in a step 2106, the ATD between M and each of the other reference nodes is obtained. This is simply the difference between the transmission timing reference for M and the transmission timing reference for each of the other reference nodes for the same common clock time C that was established during step 142. Provided the timing markers measure transmission timing associations very accurately, then the errors in the derived ATDs between pairs of reference nodes are small compared to the ATD value errors on the other network links. Next, in a step 2108, an ATD value is obtained between the node M and each non-reference node for which there is at least one link (with an ATD value) to any reference node. In step 2110, the graph is redrawn, removing all reference nodes other than M, removing all links to reference nodes and adding a single new link to M from each non-reference node from which there was previously at least one link to a reference node. In step 2112, transmission timing references are obtained relative to M for the non-reference nodes. Finally, in step 2114 timing associations are obtained for the non-reference nodes.

Figure 16:
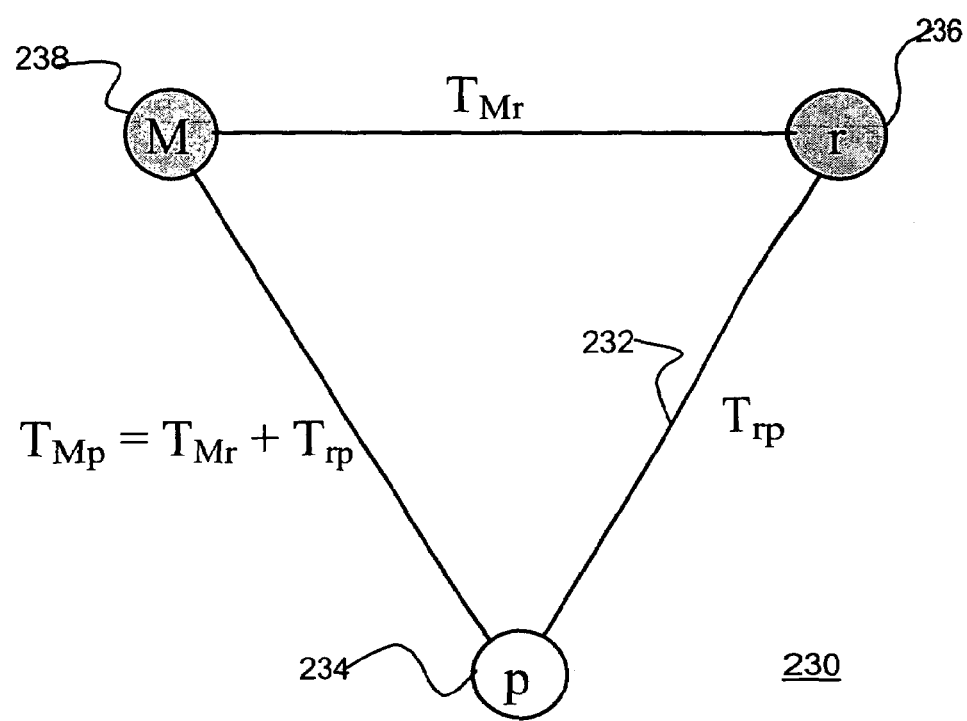
FIG. 16 shows an example of a timing derivation for the Method of FIG. 15.

FIG. 16 shows a graphical example of network 230 of application of the flow diagram 2100 of FIG. 15. So, for example a link 232 exists between a non-reference node 234, designated p, and a reference node 236, designated r, that is not the master reference node 238 (M). Thus, an ATD, $T_{rp}$, is obtained from measurements by mobile units. The ATD, $T_{Mr}$, between the master reference node 238 and reference node 236 is obtained in step 2106. The unknown ATD, $T_{Mp}$, between node 238 and node 234 is the sum, $T_{Mr}+T_{rp}$. The error and the error variance in this ATD can be assumed to be approximately equal to the error and the error variance in the ATD $T_{rp}$, provided transmission timing measurements for the reference nodes are very precise. If the node 234 has links to other reference nodes, then ATDs between 234 and 238 can be obtained relative to each of these other reference nodes in the same way. If the node 234 has a link to the node 238, then the ATD already available between 234 and 238 can be used without further adjustment. The set of ATD values between the nodes 234 and 238 thus obtained can then be averaged with reference to equations (31) and (32) to yield a single more accurate ATD value to minimize error. Thus, the error variance in each ATD value between 238 and 234 are obtained first—e.g., by assuming all error variances are equal or, from statistics provided by the base stations regarding the ATD values for the links between the node 234 and the reference nodes. Then, the set of ATD values between 238 and 234 is averaged using a weighted average in which the weight assigned to each ATD value is inversely proportion to the variance of its error. The error variance of the resulting averaged ATD value is the reciprocal of the sum of the reciprocals of the error variances for the ATD values that are averaged. This is repeated for each non-reference node that has a link (i.e. an ATD value) to at least one reference node. The result is a single ATD value between each of these non-reference nodes and the master reference node M. Moreover, for each non-reference node with links to more than one reference node, the resulting averaged ATD value between that node and the master reference node M has an error with a smaller variance and, so, is more accurate than any of the ATD values from which it is derived.

Once one ATD value is obtained between the master reference node M and each non-reference node in the network with at least one link to a reference node, the network graph is redrawn in a step 2110. So, all reference nodes except M, all links between reference nodes and all links between reference nodes and non-reference nodes are removed. Then, a single link is formed between M and each non-reference node with an ATD obtained in step 2108. Next, in step 2112, transmission timing references are obtained for all non-reference nodes from the transmission timing reference for M and the ATD values already obtained for the links in the redrawn network. The error variance in the transmission timing references so obtained may be reduced using, e.g., the example 1600 of FIG. 8, beginning in step 1602 with the network graph produced in step 2110. Continuing to step 1604, the master node M is the initial node and any non-reference node for which a transmission timing reference is needed is the final node. In step 1606, all links in the redrawn network graph of step 2110 are selected for paths and sub-paths. In the steps 1608 and 1610, paths and sub-paths are chosen from the initial node to the final node with preference given to paths containing links to the master reference node M that have lower error variance in their associated ATD values. The transmission timing difference obtained in step 1614 from the master reference node to any non-reference node can then be used to obtain a transmission timing reference for the non-reference node in step 2112 as hereinabove described. Then in step 2114, timing associations are obtained for the non-reference nodes as described hereinabove for step 146.

Advantageously, using a single master reference node of the example 2100 of FIG. 15 simplifies timing association derivation for non-reference nodes with better accuracy, provided highly accurate and reliable timing associations are available for all reference nodes. By contrast, by deriving timing associations as described for the examples 1800 in FIG. 10 and 2000 in FIG. 12, it is possible to verify whether timing data for particular reference nodes is reliable during the computation and, to reject timing data for reference nodes with suspect reliability.

The above examples are described with complete ATDs being provided to or obtained by the central entity. However, when instead of complete ATDs, relative ATDs are provided or obtained, the above described method has application to calculating relative timing differences between any reference base station and any other non-reference base station. The calculated relative timing differences are relative to the sub-unit of transmission describing ATD measurements. Also, relative time difference summation and averaging is relative to the transmission sub-unit. So, only the fractional portion of the sub-unit in any relative value is significant and any integer multiple of the sub-unit in such a result is discarded. The same convention applies to the maximum unit of transmission for any wireless technology (e.g. the hyperframe in GSM) when complete timing differences are provided. In this case also, only fractions of the maximum transmission unit in any result are considered significant. Computing the transmission timing reference for any non-reference base station using timing differences relative to a transmission sub-unit results in a transmission timing reference relative to the same transmission sub-unit. So, for example, in GSM, if ATDs are obtained relative to a single GSM frame, then the transmission timing reference obtained for any non-reference base station for some value C of common time contains only the GSM timeslot, bit and fractional bit values but not the GSM frame number. Such a timing association may not help applications that need precise common time for some future arbitrary GSM transmission time (after the common time C). Instead, a timing association may be needed that relates the complete GSM transmission time including GSM frame, timeslot and bit numbers.

Referring again to the wireless network 100 of FIG. 1, to determine a complete timing association first each base station 102, 104, 106, 108, 110, 112 periodically provides the central entity 120 with its current complete transmission timing reference. For example, each base station 102, 104, 106, 108, 110, 112 includes its current complete timing reference whenever it provides the central entity 120 with measured time differences (ATDs) for pairs of base stations 102, 104, 106, 108, 110, 112. As shown below, this enables the central entity 120 to calculate the complete timing differences between base stations 102, 104, 106, 108, 110, 112, provided the maximum error range in the complete timing value for any base station 102, 104, 106, 108, 110, 112, after reaching the central entity 120, is less than the sub-unit relative to which timing differences are measured.

The primary error sources in a complete transmission timing reference, generally, are transmission delay uncertainty (from each base station to the central entity 120) and time maintenance errors in the central entity 120. Although the transmission delay from each base station to the central entity can be estimated either by prior calculation or by real time measurements, generally, it is never known exactly. If the central entity 120 adds an estimate for this delay to the timing reference from some base station 102, 104, 106, 108, 110, 112, it can have an estimate for the current timing reference at the time of reception. If the central entity 120 also records the time of receipt using its own clock source, it can calculate the base station timing reference at any later time by adding in the amount of elapsed time. If the central entity 120 follows the same procedure for other base stations, 102, 104, 106, 108, 110, 112, it can derive estimates for the complete timing differences between pairs of base stations 102, 104, 106, 108, 110, 112 by taking the differences in these estimated time references.

Let $S$=sub-unit of transmission timing for the measured timing differences $t^*$=accurate transmission timing difference relative to $S$ between 2 base stations $A$ and $B$ obtained from $ATD$ measurements with $0 \leq t^* < S$ Let $n\,S+t$=lower bound for the estimated complete transmission time difference between $A$ and $B$  (39)

$n\,S+t+E$=upper bound for the estimated complete time transmission difference between $A$ and $B$  (40)

where $E<S$, $0 \leq t<S$ and $n \geq 0$ ($n$ is an integer)  (41)

As noted above, provided the maximum error range (E) is less than the sub-unit of transmission timing for the measured ATDs (E<S) the precise complete transmission timing difference can be derived as follows.

$$\frac{\text{precise complete}}{\text{timing difference}} = (nS + t^*) \text{ if } t^* \geq t \quad (42)$$

$$= ((n+1)S + t^*) \text{ if } t^* < t \quad (43)$$

Equations (42) and (43) follow from the restriction that the precise complete time difference must be within the range given in equations (39) and (40) and must be an integer multiple of S plus the accurate timing difference t* relative to S.

Having performed error reduction step 144 and derived timing associations for each base station in the step 146 as described hereinabove, the timing association for a particular base station or set of base stations can be provided to a recipient entity, either a mobile unit or an entity within the wireless network, such as a base station. The recipient entity can then derive a precise timing reference according to the common source of time being used (e.g. GPS) at any future time from a measurement of the current transmission timing reference for any base station (e.g. the serving base station for a mobile unit) for which a timing association was received. The recipient entity simply calculates the time difference between the transmission timing reference provided to it and the transmission timing reference currently measured. The calculated time difference is added to the common time reference. The recipient entity then adds the propagation time to the serving base station to obtain the common time reference at the current instant. In some technologies like GSM, the propagation time can be accurately determined from information previously obtained from the serving base station (e.g. the timing advance value in GSM which equals twice the propagation time).

If the recipient entity has an approximation of the common time reference (e.g. GPS time to within 1 minute), then even after the transmission timing reference for the particular base station has wrapped around the maximum transmission time unit (e.g. hyperframe in GSM), the recipient entity can still derive the current common time reference. The recipient entity can add in multiples of the maximum transmission time unit to the derived common time reference until this time agrees (approximately) with the recipient entity's initial approximation.

Advantageously, a system according to the present invention provides wireless communications network entities (e.g., mobile units or mobile stations) with a precise universal time (e.g. GPS time) source. Precision timing information is provided to off the shelf state of the art network entities without modification (except as needed to receive in the network and make use of such precision timing information), and minimally with just a single measurement unit (acting as a timing marker) taking precision timing measurements.

While the invention has been described in terms of preferred embodiments, those skilled in the art will recognize that the invention can be practiced with modification within the spirit and scope of the appended claims.

What is claimed is:

1. A method of providing precise common timing to wireless entities including mobile stations and base stations in a wireless network, said method comprising the steps of:
   a) measuring timing differences between pairs of a plurality of base stations including at least one reference base station and timing associations for said at least one reference base station;
   b) obtaining absolute timing differences (ATDs) from said measured timing differences (MTDs);
   c) aggregating said ATDs for each of said pairs of said plurality of base stations, wherein said aggregating includes averaging said ATDs for each base station pair using a moving weighted average, wherein each value for said moving weighted average is determined according to $ATD_1 = ATD_1$ ($n=1$) and, $ATD_{n+1} = (1-w)ATD_n + w\,ATD_{n+1}$ ($n \geq 1$);

where, $ATD_n = n^{th}$ absolute time difference (obtained after $ATD_{n-1}$ and before $ATD_{n+1}$),
$ATD_n' = n^{th}$ value for moving weighted average, and
w = weight (0<w<1);
d) adjusting said measured timing associations to current time;
e) reducing errors in said aggregated ATDs;
f) obtaining timing associations for non-reference base stations from said timing associations and said aggregated ATDs; and
g) providing said obtained timing associations to selected wireless network entities.

2. A method as in claim 1, wherein said plurality of base stations initiate timing difference measurements in step (a), mobile units served by said plurality of base stations measure transmission timing differences between said pairs, each of said mobile units returning measurements to a server base station.

3. A method as in claim 2, wherein said timing differences are timing differences relative to a wireless technology transmission sub-unit.

4. A method as in claim 2, wherein step (b) includes adjusting said MTDs, said ATDs being obtained from adjusted said MTDs.

5. A method as in claim 4, wherein said MTDs are transferred to one of said plurality of base stations, said one obtaining said adjusted MTDs and said ATDs.

6. A method as in claim 4, wherein said adjusted MTDs are transferred to one of said plurality of base stations, said one obtaining said ATDs.

7. A method as in claim 4, wherein said ATD obtained in step (b) is said adjusted MTD, said adjusted MTD being a propagation delay (P) difference (P2−P1) for one of said pairs subtracted from said MTD, the difference (MTD−(P2−P1)) being transferred to a server base station.

8. A method as in claim 4, wherein said MTD is adjusted by subtracting a propagation delay (P2) for one base station in one of said pairs, the difference (MTD−P2) being provided as said adjusted MTD to a serving base station, a propagation delay (P1) for the other base station in said one of said pairs being added to said adjusted MTD, the sum being said ATD.

9. A method as in claim 4, wherein said MTD is adjusted by adding a propagation delay (P1) for one base station of said base station pair, the sum (MTD+P1) being provided as said adjusted MTD to a server base station, a propagation delay (P2) for the other base station of said base station pair being subtracted from said adjusted MTD, the difference being said ATD.

10. A method as in claim 1, wherein mobile units obtain said MTDs in step (a), obtained said MTDs being transferred from said mobile units to a central network entity.

11. A method as in claim 1, wherein a timing marker unit obtains said MTDs in step (a), said MTDs being transferred from said timing marker unit to a central network entity.

12. A method as in claim 1, wherein a timing marker unit obtains said MTDs and derives said ATDs, said ATDs being transferred from said timing marker unit to a central network entity.

13. A method as in claim 1, wherein the step (c) of aggregating said ATDs includes transferring said aggregated ATDs from said plurality of base stations to a central network entity.

14. A method as in claim 1, wherein aggregating said ATDs in step (c) includes transferring said ATDs from said plurality of base stations to a central network entity.

15. A method as in claim 1, wherein an error variance is accumulated for said aggregated ATDs.

16. A method as in claim 1, wherein measuring timing associations in step (a) comprises;
  i) measuring a timing reference for a common time source; and
  ii) measuring a transmission timing reference for said at least one reference base station; and
  iii) associating said transmission timing reference with a measured current time from said common time source.

17. A method as in claim 16, wherein said common time source is a Global Positioning System (GPS) receiver in a timing marker unit.

18. A method as in claim 17, wherein said timing marker unit is a Global System for Mobile Communication (GSM) Location Measurement Unit (LMU).

19. A method as in claim 16, said step (a) of measuring timing associations further comprising:
  iv) measuring statistical information for said timing associations, said statistical information being provided to said central network entity with said timing associations.

20. A method as in claim 19 wherein measured said statistical information includes transmission timing drift and drift rate of change.

21. A method of providing precise common timing to wireless network entities including mobile stations and base stations in a wireless network, said method comprising the steps of:
  a) measuring timing differences between pairs of a plurality of base stations including reference base stations and measuring timing associations for said reference base stations;
  b) obtaining absolute timing differences (ATDs) from measured said timing differences (MTDs);
  c) aggregating and combining said ATDs for each of pairs of said plurality of base stations;
  d) adjusting measured said timing associations to current time;
  e) forming a network graph representing combined aggregated ATDs for said plurality of base stations, said forming further comprising the steps of:
    i) representing each said reference base station as a reference node in said network graph;
    ii) representing each remaining one of said plurality of base stations as a non-reference node in said network graph; and
    iii) linking selected pairs of network nodes, said network nodes including said reference nodes and said non-reference nodes, each link between said network nodes representing an ATD between corresponding represented said base stations;
  f) graphically reducing errors in said combined aggregated ATDs;
  g) obtaining timing associations for non-reference base stations from said timing associations and error reduced said ATDs; and
  h) providing obtained said timing associations to selected wireless network entities.

22. A method as in claim 21, wherein ones of said each link in step (e)(iii) represent ones of said combined aggregated ATDs.

23. A method as in claim 22, wherein said step (f) of graphically reducing errors comprises the steps of:
  i) identifying a continuous path between two said network nodes, said identified path defining a timing difference relationship between said two network nodes; and
  ii) reducing timing errors in each said continuous path.

24. A method as in claim 23, wherein path timing errors are reduced in step (f)(ii) using a relationship between a path transmission timing difference and the sum of ATDs on all path links.

25. A method as in claim 24 wherein each summed ATD on a link between a pair of said network nodes is the difference between the transmission timing for corresponding base stations.

26. A method as in claim 21, wherein said step (f) of graphically reducing errors comprises the steps of:
   i) identifying closed loops in said network graph;
   ii) listing said closed loops in an ordered list;
   iii) traversing closed loops in said ordered list and removing all closed loops sharing all links with previously traversed closed loops, each remaining listed loop being a distinct closed loop including at least one link not in any other of said preceding closed loops;
   iv) forming a timing difference relationship for each said remaining closed loop, said timing difference relationship being the zero sum of the closed loop ATDs and associated error component variables for all said distinct closed loop links;
   v) extracting from said each timing difference relationship an error component relationship;
   vi) forming additional error component relationships;
   vii) solving said error component relationships and said additional error component relationships for said error component variables in said ATDs; and
   viii) removing said error component variables from said ATDs to obtain an error reduced value for each said ATD.

27. A method as in claim 26, wherein the number of additional error component relationships formed in said step (f)(vi) equals the number of distinct links in said remaining closed loops in said step (f)(iii) minus the number of remaining closed loops in said step (f)(iii).

28. A method as in claim 26, wherein said step (e) further comprises the steps of:
   iv) obtaining a reference ATD between each pair of reference nodes from corresponding said timing associations, said corresponding timing associations relating the transmission timing of each of said corresponding pair of reference base stations to the same common time reference, said reference ATD being the difference between said transmission timing from each of said pair;
   v) removing redundant said reference ATDs, said redundant reference ATDs being dependent on other said reference ATDs;
   vi) deleting error components in remaining said reference ATDs, whereby reference ATD error components are ignored;
   vii) linking said each pair with a reference link associated with a corresponding said remaining reference ATD;
   viii) replacing any previously obtained ATD by one replacement said corresponding remaining reference ATD;
   ix) obtaining a new closed loop in said network graph and a corresponding new error component relationship for each remaining reference ATD for which there was no corresponding previously obtained ATD; and
   x) using said replacement reference ATDs and said new error component relationships to reduce the number of additional error component relationships in said step (f)(vi) needed to obtain said error component variables in said step (f)(vii).

29. A method as in claim 28, wherein before step (e)(iv) said reference nodes are placed in an ordered list and step (e)(iv) is iteratively and in order applied to each listed said reference node to obtain one reference ATD between said reference node and one of preceding said reference nodes in said ordered list; said step (e)(v) being then fulfilled.

30. A method as in claim 29, wherein the number of additional error component relationships in step (f)(vi) is reduced by the number of reference nodes less one.

31. A method as in claim 21, wherein the timing associations represented by the network graph include non-reference base station timing associations, said non-reference base station timing associations including the transmission timing difference between said non-reference base station and a reference base station added to the transmission timing of said reference base station.

32. A method as in claim 31, wherein said transmission timing difference is the sum of error reduced ATDs along a sequence of links joining a corresponding reference node to a node corresponding to said non-reference base station.

33. A method as in claim 31, wherein said transmission timing difference between one said reference base station and one said non-reference base station is the average of the sums of ATDs along alternative paths and sub-paths from said one reference base station to said one non-reference base station.

34. A method as in claim 21, wherein the step (f) of graphically reducing errors includes the steps of:
   i) selecting a set of links in said network graph;
   ii) selecting an initial node and a final node linked by links in said link set;
   iii) identifying all minimum paths from said initial node to said final node in said link set, each said link being selected in only one minimum path;
   iv) identifying alternative sub-paths, each connected between two path nodes in one of said minimum paths and including only previously unselected said links in said link set, alternative sub-path links being included in only one sub-path;
   v) identifying sub-sub-paths for any previously unselected links in said link set, each said sub-sub-path being between two nodes on a previously selected sub-path, sub-sub path links being selected for only one sub-sub-path;
   vi) repeating step (v) until all said links have been selected, whereby, additional sub-paths may be formed only by previously selected links; and
   vii) obtaining a transmission timing difference between said initial node and said final node.

35. A method as in claim 34, the step (vii) of obtaining transmission timing differences using a weighted averaging comprising the steps of:
   A) summing ATDs at links along each of said paths and each of said sub-paths;
   B) selecting a weight for summed said ATDs inversely proportional to its error variance; and
   C) combining said summed ATDs with weighted averages, the weight of each said summed ATD and each said combined summed ATD being inversely proportional to its error variance, the error variance in each weighted average equaling the reciprocal of the sum of the reciprocals of the error variances in the timing differences being averaged, whereby said weighted averaging minimizes the error variance in said transmission timing difference between path nodes.

36. A method as in claim 35, wherein said timing association of each of said reference base stations relates to the same common time reference and a distinct transmission timing reference for a non-reference base station is obtained relative to each reference base station in the step (g) comprising the steps of:
  i) determining a transmission timing difference between said each reference base station and said non-reference base station;
  ii) adding said transmission timing difference to a transmission timing component of the timing association for said each reference base station; and
  iii) averaging the transmission timing reference sums from step (ii), the average being a single transmission timing reference for said non-reference base station, said single transmission timing reference being associated with said same common time source value.

37. A method as in claim 36, wherein said averaging step (iii) is a weighted averaging step, the weight for each transmission timing reference sum being inversely proportional to the variance of its error component, whereby said weighted average has a minimum error component variance.

38. A method as in claim 36, wherein the links in said network graph are partitioned into disjoint subsets, each of said disjoint subsets being assigned to a distinct associated one of said reference nodes, said link set selected in step (f)(i) being one of said disjoint subsets, said initial node selected in step (f)(ii) being said associated reference node for said selected link set and wherein said steps (f)(i) to (f)(vii) are repeated for each said disjoint subset and each said associated reference node to obtain said transmission timing difference determined in step (g)(i) between said each associated reference node and said non-reference node.

39. A method as in claim 34, wherein said initial node corresponds to a reference base station, said final node corresponds to a non-reference base station, said link set includes all said links in said network graph and a timing association for said non-reference base station includes said transmission timing difference obtained in step (vii) added to a transmission timing reference for said reference base station.

40. A method as in claim 34, before the step (f)(i) of selecting said link set, further comprising the steps of:
  i1) obtaining a reference ATD between each pair of reference nodes from corresponding said timing associations, said corresponding timing associations relating the transmission timing of each of said pair of reference base stations to the same common time reference, said reference ATD being the difference between said transmission timing from each of said pair;
  i2) deleting error components in said reference ATDs, whereby reference ATD error components are ignored; and
  i3) linking said each pair with a reference link associated with a corresponding said reference ATD, each previously obtained ATD for a link between reference nodes being replaced by one said corresponding reference ATD.

41. A method as in claim 40, wherein paths, sub-paths and sub-sub-paths are chosen in said steps (f)(iii), (iv), (v) containing the fewest number of non-reference links.

42. A method as in claim 21, wherein said timing association of each of said reference base stations relates to the same common time reference and a distinct transmission timing reference for a non-reference base station is obtained relative to each reference base station in the step (g) comprising the steps of:
  i) determining a transmission timing difference between said each reference base station and said non-reference base station;
  ii) adding said transmission timing difference to a transmission timing component of the timing association for said each reference base station; and
  iii) averaging the transmission timing reference sums from step (ii), the average being a single transmission timing reference for said non-reference base station, said single transmission timing reference being associated with said same common time reference.

43. A method as in claim 21, wherein said timing association of each of said reference base stations relates to the same common time reference and wherein the step (g) of obtaining timing associations obtains transmission timing references for non-reference base stations, the step (g) further comprising the steps of:
  i) choosing a plurality of intermediate base stations, said intermediate base stations being distinct from said reference base stations and said non-reference base station;
  ii) determining a timing association for each of said plurality of intermediate base stations from said timing associations for said plurality of reference base stations; and
  iii) determining said timing association for said non-reference base station from said timing associations for said plurality of intermediate base stations and said timing associations for said plurality of reference base stations.

44. A method as in claim 21, wherein said timing association of each of said reference base stations relates to the same common time source value and a transmission timing reference for a non-reference base station is obtained in the step (g) comprising the steps of:
  i) choosing a plurality of non-reference nodes as intermediate nodes;
  ii) sequentially obtaining a transmission timing reference and error variance for each intermediate node, each said transmission timing reference and error variance being obtained from the transmission timing references related to the timing associations for reference nodes and from any previously obtained transmission timing references and error variances for other ones of said intermediate nodes;
  iii) obtaining a transmission timing reference for said non-reference node corresponding to said non-reference base station from obtained said transmission timing references and error variances for said intermediate nodes and from the transmission timing references related to the timing associations for said reference nodes; and
  iv) obtaining a timing association for said non-reference node from the association of said obtained transmission timing reference with said same common time source value.

45. A method as in claim 44, wherein said transmission timing reference and said error variance obtained for any said intermediate node in step (ii) and said transmission timing reference obtained for said non-reference node in the step (iii) are obtained from each said transmission timing reference for any of said reference nodes and for any of said intermediate nodes in set network graph.

46. A method as in claim 45, the step (f) of graphically reducing errors comprising the steps of:
  i) choosing a node from said plurality of intermediate nodes and said non-reference node ii) assigning a unique subset of links to ones of said reference nodes and said intermediate nodes, each of said links being in only one said unique subset and being assigned for only one chosen said node;

iii) obtaining a transmission timing difference and an associated error variance between the transmission timing for said chosen node and transmission timing for each of said ones;

iv) obtaining a relative transmission timing reference for said chosen node relative to each of said ones, said relative transmission timing reference being a corresponding said transmission timing difference between said chosen node and said each of said ones plus a previously obtained transmission timing reference for said each of said ones;

v) extracting for said chosen node an error variance for each said relative transmission timing reference, the error variance being the sum of error variances of said corresponding transmission timing difference and said previously obtained transmission timing reference for said ones; and vi) averaging relative transmission timing references for said chosen node with a weighted average to obtain a single transmission timing reference and error variance for said chosen node, weights being assigned to each said relative transmission timing reference inversely proportional to extracted said error variance, said single transmission timing reference and single error variance having improved accuracy over previously obtained said transmission timing references and error variances, and said single error variance being equal to the reciprocal of the sum of the reciprocals of the error variances in the transmission timing references being averaged.

47. A method as in claim 46, further comprising the steps of:

(vii) checking whether each said intermediate node and said non-reference node have been chosen in step (f)(i) and, returning to step (f)(i) upon a determination that any of each said intermediate node and said non-reference node have not been chosen, returning to step (f)(i) and choosing a previously unchosen one, said non-reference node being chosen last; and (viii) assigning a subset of links to each said intermediate node in step (f)(ii) for only one said chosen node.

48. A method as in claim 47, wherein the step (f)(iii) of obtaining a transmission timing difference between said chosen node and each of said ones comprises the steps of:

A) assigning each of said ones as an initial node and said chosen node as a final node;

B) identifying all minimum paths from each said initial node to said final node, said minimum paths using links only from said unique subset of links assigned to said initial node in step (f)(ii), each said link being in only one minimum path;

C) identifying alternative sub-paths, each connected between two path nodes in one of said minimum paths and including only previously unselected said links in said unique subset of links, alternative sub-path links being identified to only one sub-path;

D) identifying sub-sub-paths for any previously unselected links in said unique subset of links, each said sub-sub-path being between two nodes in one of said sub-paths, sub-sub path links being selected for only one sub-sub-path;

E) repeating step (D) until all said links in said unique subset of links have been selected, whereby, additional sub-paths may be formed only by previously selected links; and F) obtaining a transmission timing difference between said initial node and said final node.

49. A method as in claim 48 wherein the step (F) of obtaining a transmission timing difference comprises the steps of:

I) summing ATDs along each of said paths and each of said sub-paths and each of said sub-sub-paths to obtain timing differences along said paths, sub-paths and sub-sub-paths;

II) obtaining an error variance for each said timing difference equaling the sum of the error variance values for said corresponding summed ATDs;

III) selecting a weight for each said timing difference inversely proportional to its error variance; and IV) weighting and combining said timing differences in a weighted averages, the error variance in each said weighted average equaling the reciprocal of the sum of the reciprocals of the error variances in the timing differences being averaged, whereby said weighted average minimizes the error variance in combined said timing differences, whereby the result of combining all timing differences is a transmission timing difference with minimal error variance between path nodes.

50. A method as in claim 21, wherein the step (f) of graphically reducing errors comprises the steps of:

i) selecting one reference node as a master reference node;

ii) obtaining a reference ATD between said master reference node and each of the other of said reference nodes, said reference ATD being the difference between a transmission timing reference of timing associations for said master reference node and said each other of said reference nodes, said timing associations relating the transmission timing of said master reference node and said each other to the same common time source value;

iii) deleting error components in said reference ATDs, whereby reference ATD error components are ignored;

iv) obtaining an effective ATD and error variance between said master reference node and each said non-reference node with at least one link to one of said reference nodes;

v) reducing said network graph by removing all reference nodes except said master reference node, removing all links between reference nodes and between said each non-reference node and removed said reference nodes and adding a new link between said master reference node and every said each non-reference node, each said new link representing a corresponding said effective ATD; and vi) obtaining a timing association for said non-reference nodes from the reduced said network graph.

51. A method as in claim 50, wherein the step (iv) comprises the steps of:

A) obtaining an ATD between said master reference node and said non-reference node relative to each reference node with a link to said non-reference node, said ATD being the sum of the ATD between said master reference node and said reference node and the ATD between said reference node and said non-reference node, the error variance on said ATD being equal to the error variance in said ATD between said reference node and said non-reference node; and B) averaging obtained said ATDs using a weighted average, said weighted average ATD being said effective ATD, weights being selected for each said ATD inversely proportional to its error variance, the error variance in the resulting averaged said ATD being equal to the reciprocal of the sum of the reciprocals of the error variances of the ATDs being averaged.

52. A method as in claim 21 wherein ATDs obtained in step (b) are relative to a sub-unit of transmission for a wireless technology and wherein base stations provide complete transmission timing references to a central network entity and wherein any of step (c) further comprises the steps of:
   i) adjusting each received said complete transmission timing reference to compensate for both a propagation time to said central network entity from a corresponding one of said base stations and an intervening time between receipt of said complete transmission timing reference by said central network entity and the current time;
   ii) approximating a complete transmission timing difference between a pair of base stations from the difference between said adjusted complete transmission timing references for each of said base stations; and
   iii) combining each approximated said complete transmission timing difference with a precise transmission timing difference relative to said sub-unit of transmission, whereby said combination yielding a $$\text{precise complete time difference} = (nS + t^*) \quad \text{if } t^* \geq t,$$
$$= ((n+1)S + t^*) \quad \text{if } t^* < t,$$

where
S=said sub-unit of transmission
t*=said precise timing difference relative to S ($0 \leq t^* < S$) and n is an integer with $n \geq 0$
n S+t=lower bound of said approximate complete time difference
n S+t+E=upper bound of said approximate complete time difference
E=uncertainty range where E<S and $0 \leq t < S$.

53. A method as in claim 21 wherein ATDs obtained in step (b) are relative to a sub-unit of transmission for a wireless technology and wherein base stations provide complete transmission timing references to a central network entity and wherein any of step (f) further comprises the steps of:
   i) adjusting each received said complete transmission timing reference to compensate for both a propagation time to said central network entity from a corresponding one of said base stations and an intervening time between receipt of said complete transmission timing reference by said central network entity and the current time;
   ii) approximating a complete transmission timing difference between a pair of base stations from the difference between said adjusted complete transmission timing references for each of said base stations; and
   iii) combining each approximated said complete transmission timing difference with a precise transmission timing difference relative to said sub-unit of transmission, whereby said combination yielding a $$\text{precise complete time difference} = (nS + t^*) \quad \text{if } t^* \geq t,$$
$$= ((n+1)S + t^*) \quad \text{if } t^* < t,$$

where
S=said sub-unit of transmission
t*=said precise timing difference relative to S ($0 \leq t^* < S$) and n is an integer with $n \geq 0$
n S+t=lower bound of said approximate complete time difference
n S+t+E=upper bound of said approximate complete time difference
E=uncertainty range where E21 S and $0 \leq t < S$.

54. A method as in claim 21 wherein ATDs obtained in step (b) are relative to a sub-unit of transmission for a wireless technology and wherein base stations provide complete transmission timing references to a central network entity and wherein any of step (g) further comprises the steps of:
   i) adjusting each received said complete transmission timing reference to compensate for both a propagation time to said central network entity from a corresponding one of said base stations and an intervening time between receipt of said complete transmission timing reference by said central network entity and the current time;
   ii) approximating a complete transmission timing difference between a pair of base stations from the difference between said adjusted complete transmission timing references for each of said base stations; and
   iii) combining each approximated said complete transmission timing difference with a precise transmission timing difference relative to said sub-unit of transmission, whereby said combination yielding a $$\text{precise complete time difference} = (nS + t^*) \quad \text{if } t^* \geq t,$$
$$= ((n+1)S + t^*) \quad \text{if } t^* < t,$$

where
S=said sub-unit of transmission
t*=said precise timing difference relative to S ($0 \leq t^* < S$) and n is an integer with $n \geq 0$
n S+t=lower bound of said approximate complete time difference
n S+t+E=upper bound of said approximate complete time difference
E=uncertainty range where E<S and $0 \leq t < S$.

55. A method as in claim 21, wherein mobile units measure said measured timing differences provided in step (a).

56. A method as in claim 55, wherein said wireless network is a GSM or GPRS network, a central network entity is a Global System for Mobile Communication (GSM) serving mobile location center (SMLC) and said measured timing differences in step (a) are measurements related to enhanced-observed timing difference (E-OTD) positioning.

57. A method as in claim 56, wherein ones of said mobile units support GPS or A-GPS positioning and wherein obtaining said ATDs in said step (b) comprises:
   i) obtaining positions for said ones using GPS or A-GPS positioning;

ii) obtaining propagation delays between said ones and said pairs using said positions and positions of said pairs; and iii) combining said propagation delays and said measured timing differences to obtain said ATDs.

58. A method as in claim 55, wherein said wireless network is a UMTS network, a central network entity is a UMTS serving mobile location center (SMLC), Radio Network Controller or Base Station and said measured timing differences in step (a) are measurements related to Observed Time Difference Of Arrival (OTDOA) positioning.

59. A method as in claim 58, wherein ones of said mobile units support GPS or A-GPS positioning and wherein obtaining said ATDs in said step (b) comprises:

i) obtaining positions for said ones using GPS or A-GPS positioning;

ii) obtaining propagation delays between said ones and said pairs using said positions and positions of said pairs; and iii) combining said propagation delays and said measured timing differences to obtain said ATDs.

60. A method as in claim 55, wherein said mobile units are Global System for Mobile Communication (GSM) units and at least one GSM mobile unit provides said transmission time differences to a new base station responsive to a handover from an old base station to said new base station.

61. A method as in claim 55, wherein said mobile units are General Packet Radio Service (GPRS) mobile units and at least one GPRS mobile unit provides said transmission time differences to a new base station responsive to a handover from an old base station to said new base station.

62. A method as in claim 55, wherein said transmission timing differences are measured in the step a) responsive to an event, said event selected from a group including:

a command from a central entity;

a command from a base station;

a change of serving cell for a mobile unit;

a change of transmission timing difference by a preset amount; and a time periodic event.

* * * * *